US011332120B2

(12) United States Patent
Hung et al.

(10) Patent No.: US 11,332,120 B2
(45) Date of Patent: May 17, 2022

(54) METHOD OF ENERGY MANAGEMENT AND COMPUTER SYSTEM FOR ENERGY MANAGEMENT

(71) Applicant: National Taiwan Normal University, Taipei (TW)

(72) Inventors: Yi-Hsuan Hung, Taipei (TW); Syuan-Yi Chen, Taipei (TW); Kai-Lin Lee, Taipei (TW); Po-Lin Shih, Taipei (TW); Tzu-Cheng Chou, Taipei (TW); Wei-Gang Chen, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 155 days.

(21) Appl. No.: 16/802,044

(22) Filed: Feb. 26, 2020

(65) Prior Publication Data
US 2020/0398813 A1 Dec. 24, 2020

(30) Foreign Application Priority Data
Jun. 24, 2019 (TW) .................................. 108121907

(51) Int. Cl.
*B60W 20/15* (2016.01)
*B60L 15/20* (2006.01)
(Continued)

(52) U.S. Cl.
CPC ......... *B60W 20/15* (2016.01); *B60L 15/2045* (2013.01); *B60L 50/75* (2019.02);
(Continued)

(58) Field of Classification Search
CPC ...... B60L 15/2045; B60L 58/13; B60L 58/14; B60W 20/10; B60W 20/11; B60W 20/13;
(Continued)

(56) References Cited

U.S. PATENT DOCUMENTS

| 5,820,172 A * | 10/1998 | Brigham ............... B60W 10/26 |
|---|---|---|
| | | 290/400 |
| 2008/0059013 A1 * | 3/2008 | Liu ........................... B60L 7/18 |
| | | 701/22 |

(Continued)

FOREIGN PATENT DOCUMENTS

| CN | 102416950 A * | 4/2012 | |
|---|---|---|---|
| DE | 102014222626 A1 * | 5/2016 | .......... B60W 30/188 |

(Continued)

OTHER PUBLICATIONS

Paganelli, Gino et al., "Optimizing control strategy for hybrid fuel cell vehicle", SAE Technical Paper 2002-01-0102, Mar. 4, 2002, 11 pages (Year: 2002).*

(Continued)

*Primary Examiner* — David A Testardi
(74) *Attorney, Agent, or Firm* — Birch, Stewart, Kolasch & Birch, LLP

(57) ABSTRACT

A method of energy management includes steps of: deciding system parameters; determining an object function; obtaining characteristics information and predetermined ranges respectively of the system parameters; calculating function values of the object function for various parameter value combinations of the system parameters within the predetermined ranges based on the characteristics information so as to establish a database; determining a smallest function value among those of the function values in the database that satisfy certain conditions; and determining an optimum power split ratio based on the parameter value combination corresponding to the smallest function value for energy management of the vehicle.

16 Claims, 13 Drawing Sheets

(51) Int. Cl.
  *B60W 10/26* (2006.01)
  *B60W 10/06* (2006.01)
  *B60L 58/14* (2019.01)
  *B60L 50/75* (2019.01)
  *B60W 20/11* (2016.01)
  *B60W 50/00* (2006.01)

(52) U.S. Cl.
  CPC ............. *B60L 58/14* (2019.02); *B60W 10/06* (2013.01); *B60W 10/26* (2013.01); *B60W 20/11* (2016.01); *B60W 50/0097* (2013.01); *B60L 2240/441* (2013.01); *B60L 2240/443* (2013.01)

(58) Field of Classification Search
  CPC .. B60W 20/15; B60W 50/0097; B60W 10/26; Y02T 10/72
  See application file for complete search history.

(56) References Cited

U.S. PATENT DOCUMENTS

| | | | | |
|---|---|---|---|---|
| 2009/0150016 A1* | 6/2009 | Hung | ................... | B60W 10/08 701/22 |
| 2018/0236996 A1* | 8/2018 | Oba | ...................... | B60W 20/11 |
| 2019/0184805 A1* | 6/2019 | Yan | ........................ | B60K 6/105 |
| 2020/0198495 A1* | 6/2020 | Rizzoni | ................... | B60L 50/51 |
| 2020/0324754 A1* | 10/2020 | Song | ..................... | B60W 10/08 |
| 2020/0369258 A1* | 11/2020 | Liu | ........................ | B60K 6/547 |
| 2020/0391721 A1* | 12/2020 | Wang | ................... | B60W 20/12 |
| 2021/0162855 A1* | 6/2021 | Kumar | ................. | B60W 10/08 |
| 2021/0213933 A1* | 7/2021 | Borrelli | ............. | B60W 50/0097 |

FOREIGN PATENT DOCUMENTS

| | | | | |
|---|---|---|---|---|
| JP | 2018149952 A | * | 9/2018 | |
| WO | WO-2013131735 A2 | * | 9/2013 | .......... B60L 15/2045 |

OTHER PUBLICATIONS

Liu, Jinming et al., "Control optimization for a power-split hybrid vehicle", Proceedings of the 2006 American Control Conference (2006 ACC), Minneapolis, MN, USA, Jun. 14-16, 2006, pp. 466 to 471 (Year: 2006).*

Hung, Yi-Hsuan et al., "Optimal control of integrated energy management/mode switch timing in a three-power-source hybrid powertrain", Applied Energy, vol. 173 (2016), pp. 184 to 196 (Year: 2016).*

* cited by examiner

METHOD OF ENERGY MANAGEMENT AND COMPUTER SYSTEM FOR ENERGY MANAGEMENT

CROSS-REFERENCE TO RELATED APPLICATION

This application claims priority of Taiwanese Invention Patent Application No. 108121907, filed on Jun. 24, 2019.

FIELD

The disclosure relates to a method of energy management and a computer system of energy management, and more particularly to a method of energy management and a computer system of energy management that are adapted to be utilized on a vehicle with multiple energy sources.

BACKGROUND

A conventional method of energy management utilized on a vehicle with multiple energy sources (e.g., a fuel source and a battery source) is rule-based. That is to say, switching between energy sources to supply energy for operations of the vehicle is determined according to predetermined rules that may be related to the required torque and the current engine/motor speed to ensure efficient operation of the vehicle. For example, the vehicle is configured to be powered solely by a motor of the vehicle using the battery source when the vehicle operates in a motor mode for traveling at low speed. The vehicle is configured to be powered solely by an engine of the vehicle using the fuel source when the vehicle operates in an engine mode for traveling at high speed. The vehicle is configured to be powered by both the engine and the motor of the vehicle at a fixed power ratio between the engine and the motor (e.g., 3:7) when the vehicle operates in a hybrid mode. One shortcoming of the conventional method of energy management is that it fails to consider minimization of the total power consumption of the vehicle.

SUMMARY

Therefore, an object of the disclosure is to provide a method of energy management and a computer system for energy management that can alleviate at least one of the drawbacks of the prior art.

According to one aspect of the disclosure, the computer system of energy management is adapted to be utilized on a vehicle with multiple energy sources. The vehicle includes a powering unit, and an energy unit which supplies energy to the powering unit. The computer system includes a parameter determination module, an object function determination module, a storage, a processing module and a search module.

The parameter determination module is configured to decide, based on a configuration of the powering unit and the energy unit, a plurality of system parameters that are related to the powering unit and the energy unit.

The object function determination module is communicable with the parameter determination module. The object function determination module is configured to determine, based on the system parameters and the configuration of the powering unit and the energy unit, an object function J that represents a total equivalent energy consumption of the vehicle and that is associated with the system parameters.

The storage is configured to store characteristics information that is related to the powering unit and the energy unit, and a plurality of predetermined ranges respectively of the system parameters.

The processing module is communicable with the object function determination module and the storage. The processing module is configured to calculate byway of an algorithm of nested-loops and based on the characteristics information and the predetermined ranges of the system parameters, a plurality of function values of the object function J each corresponding to a respective one of multiple parameter value sets each containing corresponding parameter values, where for each of the parameter value sets, each of the parameter values contained therein is a value of a respective one of the system parameters, so as to establish a database that records the function values thus calculated and the respective parameter value sets. The parameter values contained in the parameter value sets are obtained by performing discretization on the predetermined ranges of the system parameters.

The search module is communicable with the database. The search module is configured to determine a smallest function value among the function values in the database that correspond to those of the parameter value sets that contain the parameter values which meet current conditions of the powering unit and the energy unit and match a value of demanded power $P_d$ of the vehicle, and to determine an optimum power split ratio based on one of the parameter value sets that corresponds to the smallest function value, the optimum power split ratio being to be used for management of the vehicle.

The method of energy management is adapted to be utilized on a vehicle with multiple energy sources. The vehicle includes a powering unit, and an energy unit which supplies energy to the powering unit. The method is to be implemented by a computer system. The method includes steps of:

A) based on a configuration of the powering unit and the energy unit, deciding a plurality of system parameters that are related to the powering unit and the energy unit;

B) based on the system parameters thus decided and the configuration of the powering unit and the energy unit, determining an object function J that represents a total equivalent energy consumption of the vehicle and that is associated with the system parameters;

C) based on the configuration of the powering unit and the energy unit, obtaining characteristics information that is related to the powering unit and the energy unit, and obtaining a plurality of predetermined ranges respectively of the system parameters;

D) calculating, by way of an algorithm of nested-loops and based on the characteristics information and the predetermined ranges of the system parameters, a plurality of function values of the object function J each corresponding to a respective one of multiple parameter value sets each containing corresponding parameter values, where for each of the parameter value sets, each of the parameter values contained therein is a value of a respective one of the system parameters, so as to establish a database that records the function values thus calculated and the respective parameter value sets, the parameter values contained the parameter value sets being obtained by performing discretization on the predetermined ranges of the system parameters; and E) determining a smallest function value among the function values in the database that correspond to those of the parameter value sets that contain the parameter values which meet current conditions of the powering unit and the energy unit and which correspond to a value of demanded power $P_d$ of the vehicle, and determining an optimum power split ratio based on one of the parameter value sets that corresponds to the smallest function value, wherein the optimum power split ratio is to be used for energy management of the vehicle.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
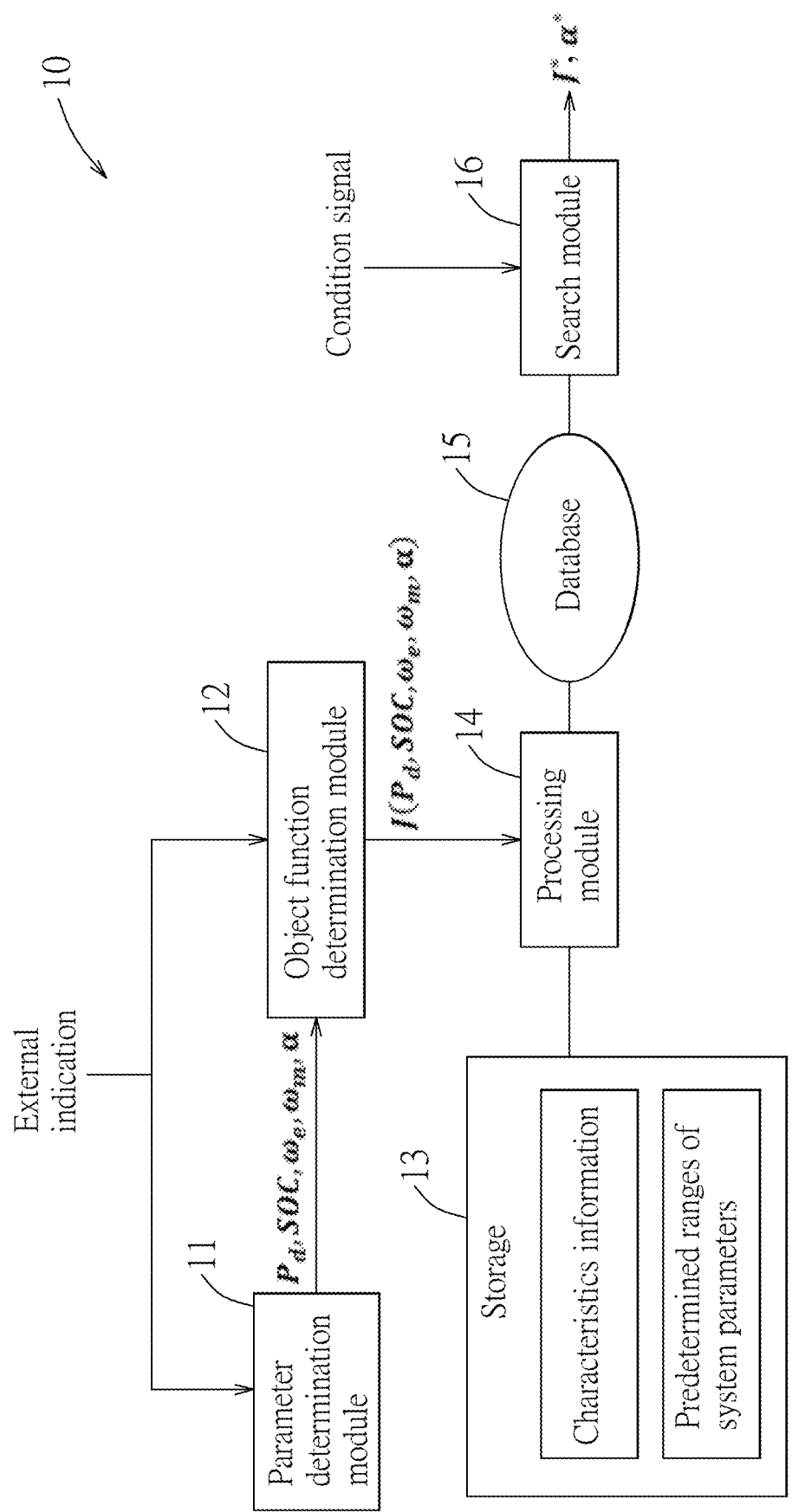
FIG. 1 is a block diagram illustrating a first embodiment of a computer system for energy management to be utilized on a vehicle with multiple energy sources according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
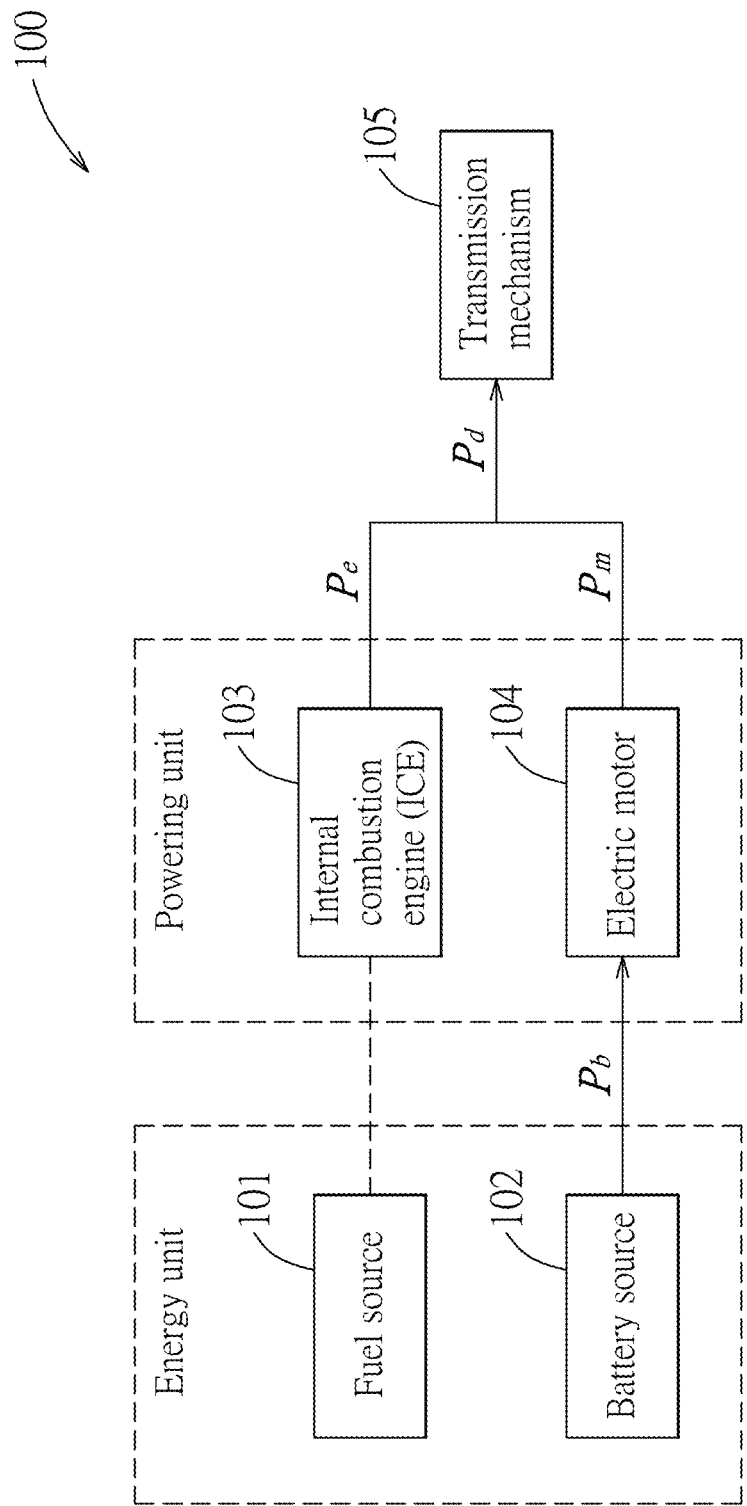
FIG. 2 is a block diagram illustrating an embodiment of the vehicle.

Referring to FIGS. 1 and 2, a first embodiment of a computer system 10 for energy management to be utilized on a vehicle 100 with multiple energy sources is illustrated. The computer system 10 includes a parameter determination module 11, an object function determination module 12, a storage 13, a processing module 14 and a search module 16. It should be noted that each of the parameter determination module 11, the object function determination module 12, the processing module 14 and the search module 16 may be implemented by one of hardware, firmware, software, and any combination thereof. For example, the parameter determination module 11, the object function determination module 12 and the search module 16 may be implemented to be software modules in a program, where the software modules contain codes and instructions to carry out specific functionalities, and can be called individually or together to fulfill tasks required by the computer system 10 of this disclosure. For example, the processing module 14 may be a processor, such as a central processing unit (CPU), or may be a software-implemented module having processing capabilities. It is worth to note that the parameter determination module 11, the object function determination module 12, the processing module 14 and the search module 16, and optionally the storage 13, may be realized together by a computer (not shown). The computer may be independent from a vehicle control unit (VCU) of the vehicle 100, or may be integrated into the VCU.

In this embodiment, the vehicle 100 is a hybrid electric vehicle (HEV), but implementation of the vehicle 100 is not limited thereto. Referring to FIG. 2, the vehicle 100 includes a transmission mechanism 105, a powering unit that drives the transmission mechanism 105, and an energy unit which supplies energy to the powering unit. The powering unit includes an internal combustion engine (ICE) 103 and an electric motor 104. The energy unit includes a fuel source 101 and a battery source 102. The battery source 102 is one of a lithium battery, a fuel cell and a supercapacitor (SC), but is not limited thereto. For example, the battery source 102 may be a lead-acid battery which has similar characteristics to a lithium battery. In this embodiment, the battery source 102 is a lithium battery.

The parameter determination module 11 is configured to decide a plurality of system parameters that are related to the powering unit and the energy unit based on configuration of the powering unit and the energy unit. The configuration of the powering unit and the energy unit indicates what the powering unit and the energy unit are made up of, and is provided by an external indication that may be provided by the VCU, but is not limited thereto. Since the vehicle 100 in this embodiment is an HEV, the external indication would indicate that the powering unit includes the ICE 103 and the electric motor 104, and that the energy unit includes the fuel source 101 and the battery source 102, and such information serves as the configuration of the powering unit and the energy unit.

The object function determination module 12 is communicable with the parameter determination module 11. The object function determination module 12 is configured to determine, based on the system parameters decided by the parameter determination module 11 and the configuration of the powering unit and the energy unit, an object function J that represents a total equivalent energy consumption of the vehicle 100 and that is associated with the system parameters. Since the vehicle 100 in this embodiment is an HEV and the external indication indicates that the energy unit includes the fuel source 101, the total equivalent energy consumption of the vehicle 100 is regarded as a total equivalent fuel consumption.

The storage 13 is configured to store characteristics information that is related to the powering unit and the energy unit, and a plurality of predetermined ranges respectively of the system parameters. In this embodiment, the storage 13 is implemented by flash memory, a hard disk drive (HDD), a solid state disk (SSD), an electrically-erasable programmable read-only memory (EEPROM), or any other volatile/non-volatile memory devices, but implementation of the storage 13 is not limited to the disclosure herein and may vary in other embodiments.

The processing module 14 is communicable with the object function determination module 12 and the storage 13. The processing module 14 is configured to calculate, by way of nested-loops and based on the characteristics information and the predetermined ranges of the system parameters stored in the storage 13, a plurality of function values of the object function J each corresponding to a respective one of multiple parameter value sets each containing corresponding parameter values, where for each of the parameter value sets, each of the parameter values contained therein is a value of a respective one of the system parameters, so as to establish a database 15 that records the function values thus calculated and the respective parameter value sets. The parameter values contained in the parameter value sets are obtained by performing discretization on the predetermined ranges of the system parameters.

The search module 16 is communicable with the database 15. The search module 16 is configured to determine a smallest function value J* among the function values in the database 15 that correspond to those of the parameter value sets that contain the parameter values which meet current conditions of the powering unit and the energy unit and which correspond to a value of demanded power $P_d$ of the vehicle 100 (power demanded/required by the vehicle 100), and to determine an optimum power split ratio α* based on the parameter value set corresponding to the smallest function value J*, wherein the optimum power split ratio α* is to be used for energy management of the vehicle 100.

Specifically speaking, the battery source 102 supplies electrical energy to the electric motor 104 with output power $P_b$ so as to enable working of the electric motor 104 with output power $P_m$ based on the output power $P_b$. Therefore, the relationship between the output power $P_b$ of the battery source 102 and the output power $P_m$ of the electric motor 104 can be expressed as $$P_b = \frac{P_m}{\eta_m},$$

where $\eta_m$ represents motor efficiency of the electric motor 104. The motor efficiency $\eta_m$ of the electric motor 104 is related to motor speed $\omega_m$ of the electric motor 104 and output torque $T_m$ of the electric motor 104 where $$T_m = \frac{P_m}{\omega_m},$$

so the motor efficiency $\eta_m$ can be expressed as $\eta_m=\eta_m(T_m, \omega_m)$. Similarly, the ICE 103 works with output power $P_e$.

Engine efficiency $\eta_e$ of the ICE 103 is related to engine speed $\omega_e$ of the ICE 103 and output torque $T_e$ of the ICE 103 where $$T_e = \frac{P_e}{\omega_e},$$

so the engine efficiency $\eta_e$ can be expressed as $\eta_e=\eta_e(T_e, \omega_e)$. Ideally, the demanded power $P_d$ of the vehicle 100 is equal to input power provided to the transmission mechanism 105, i.e., a sum of the output power $P_e$ of the ICE 103 and the output power $P_m$ of the electric motor 104, and therefore the demanded power $P_d$ can be expressed as $P_d=P_e+P_m$.

Figure 3:
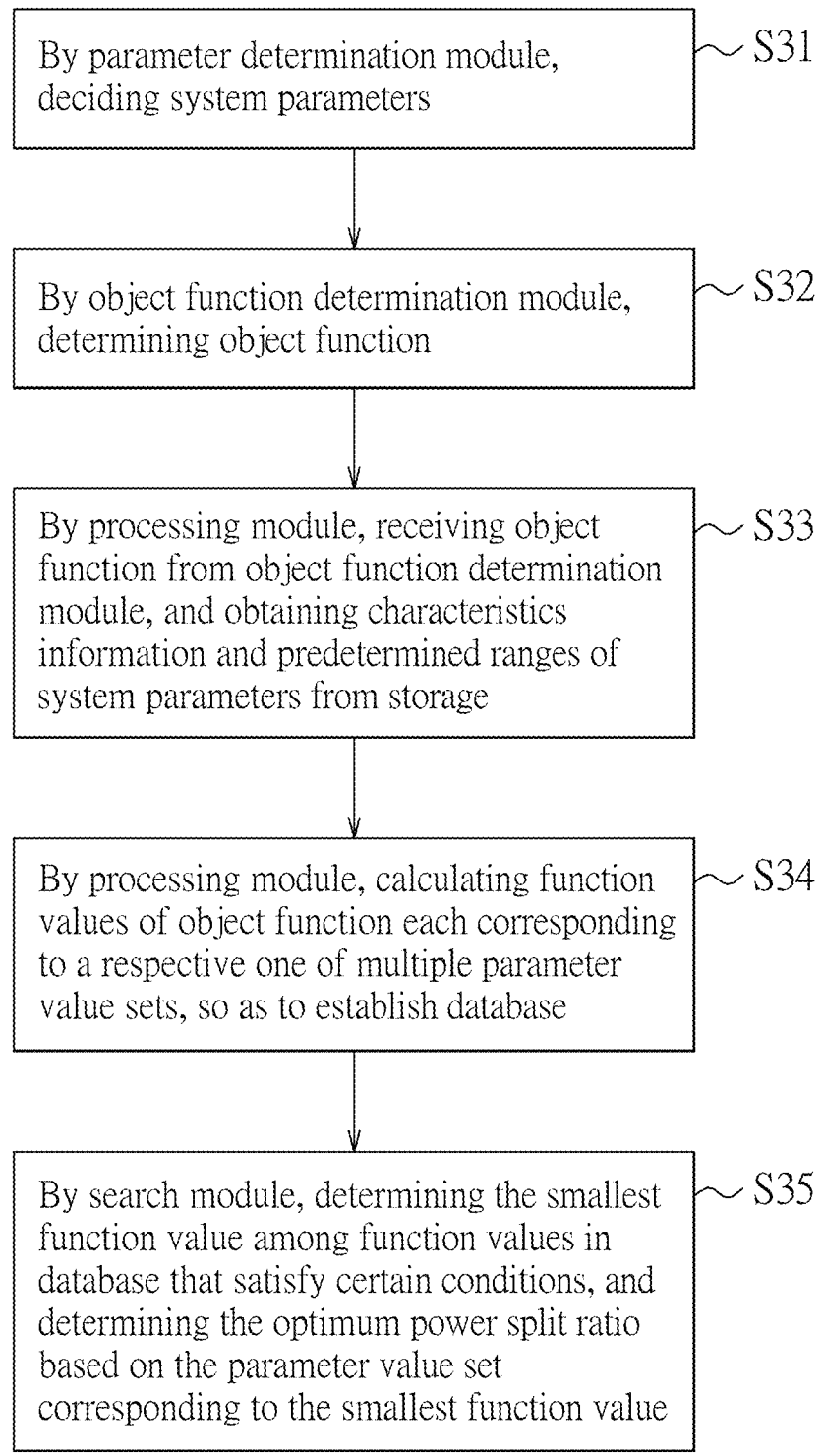
FIG. 3 is a flow chart illustrating a first embodiment of a method of energy management implemented by the computer system for energy management according to the disclosure.

Referring to FIGS. 1 to 3, a first embodiment of a method of energy management according to the disclosure to be utilized on the vehicle 100 with multiple energy sources is illustrated. The method is adapted to be implemented by the computer system 10 that is previously described. The method includes steps S31 to S35 outlined below.

In step S31, the parameter determination module 11 decides the system parameters that are related to the powering unit and the energy unit based on the configuration of the powering unit and the energy unit. In this embodiment, since the powering unit includes the ICE 103 and the electric motor 104, and the energy unit includes the fuel source 101 and the battery source 102 (i.e., the configuration of the powering unit and the energy unit), the system parameters includes the demanded power $P_d$, the engine speed $\omega_e$ of the ICE 103, the motor speed $\omega_m$ of the electric motor 104, a state of charge (SOC) of the battery source 102 that indicates residual capacity of the battery source 102, and a power split ratio α that relates to power distribution between the ICE 103 and the electric motor 104 and that ranges from zero to one. For example, the power split ratio α with a value of 0.3 indicates that the power distribution between the ICE 103 and the electric motor 104 is 3 to 7. However, contents of the system parameters are not limited to the disclosure herein and may vary in other embodiments.

In step S32, the object function determination module 12 determines the object function J based on the system parameters decided in step S31 and the configuration of the powering unit and the energy unit. In this embodiment, considering that the powering unit includes the ICE 103 and the electric motor 104, and that the energy unit includes the fuel source 101 and the battery source 102, the object function J is $J(P_d, SOC, \omega_e, \omega_m, \alpha)=\dot{m}_e+f(SOC)\times\dot{m}_b+\gamma_p$, where $\dot{m}_e$ represents actual fuel consumption of the ICE 103, $\dot{m}_b$ represents equivalent fuel consumption of the battery source 102, f(SOC) represents a weight factor of the equivalent fuel consumption of the battery source 102 and is a function of the SOC, and $\gamma_p$ represents a penalty value that is related to a threshold value for the output torque of the ICE 103 and a threshold value for the output torque of the electric motor 104. The penalty value $\gamma_p$ is decided based on an operating status of the powering unit (i.e., the output torque $T_e$ of the ICE 103 and the output torque $T_m$ of the electric motor 104), and serves as an indicator as to whether or not the powering unit is operating normally. In this embodiment, the penalty value $\gamma_p$ is equal to zero when the value of the output torque $T_m$ of the ICE 103 is not greater than the threshold value therefor and the value of the output torque $T_m$ of the electric motor 104 is not greater than the threshold value therefor, and is equal to a predetermined value greater than zero (e.g., $10^6$, but is not limited thereto) when the value of any of the output torque $T_e$ of the ICE 103 and the output torque $T_m$ of the electric motor 104 is greater than the corresponding threshold value. That is to say, the penalty value $\gamma_p$ is equal to zero (i.e., $\gamma_p=0$) when the powering unit is operating normally, and is equal to the predetermined value (i.e., $\gamma_p=10^6$) when the powering unit is not operating normally.

Further, according to equation $P_d=P_e+P_m$, the output power $P_e$ of the ICE 103 and the output power $P_m$ of the electric motor 104 can be expressed respectively as:

$$P_e = \alpha \times P_d; \text{ and}$$

$$P_m = (1-\alpha) \times P_d.$$

In addition, the actual fuel consumption $\dot{m}_e$ of the ICE 103 can be expressed as $$\dot{m}_e = \frac{\alpha \times P_d}{\eta_e \times LHV},$$

where LHV represents a lower heating value (LHV) of a fuel used by the ICE 103. Similarly, the equivalent fuel consumption $\dot{m}_b$ of the battery source 102 can be expressed as $$\dot{m}_b = \frac{P_b \times BSFC_{avg}}{3600 \times \eta_b},$$

where $\eta_b$ represents discharge efficiency of the battery source 102, $BSFC_{avg}$ represents an average of values of brake specific fuel consumption (BSFC) of the ICE 103 over a preset operation time period, where BSFC is defined as an amount of fuel consumed for producing 1 kWh of energy. It is worth to note that the average of BSFC $BSFC_{avg}$ is calculated by averaging the values of the amount of fuel consumed for producing 1 kWh of energy when the ICE 103 is operated in a preset condition, and is related to the engine speed $\omega_e$ of the ICE 103 and the output torque $T_e$ of the ICE 103. Substituting $$P_b = \frac{P_m}{\eta_m}$$

and $P_m=(1-\alpha)\times P_d$ into $$\dot{m}_b = \frac{P_b \times BSFC_{avg}}{3600 \times \eta_b}$$

results in $$\dot{m}_b = \frac{\frac{(1-\alpha)\times P_d}{\eta_m} \times BSFC_{avg}}{3600 \times \eta_b}.$$

Consequently, the object function J can be rewritten as $$J(P_d, SOC, \omega_e, \omega_m, \alpha) = \frac{\alpha \times P_d}{\eta_e \times LHV} + f(SOC) \times \frac{\frac{(1-\alpha)\times P_d}{\eta_m} \times BSFC_{avg}}{3600 \times \eta_b} + \gamma_p.$$

Figure 6:
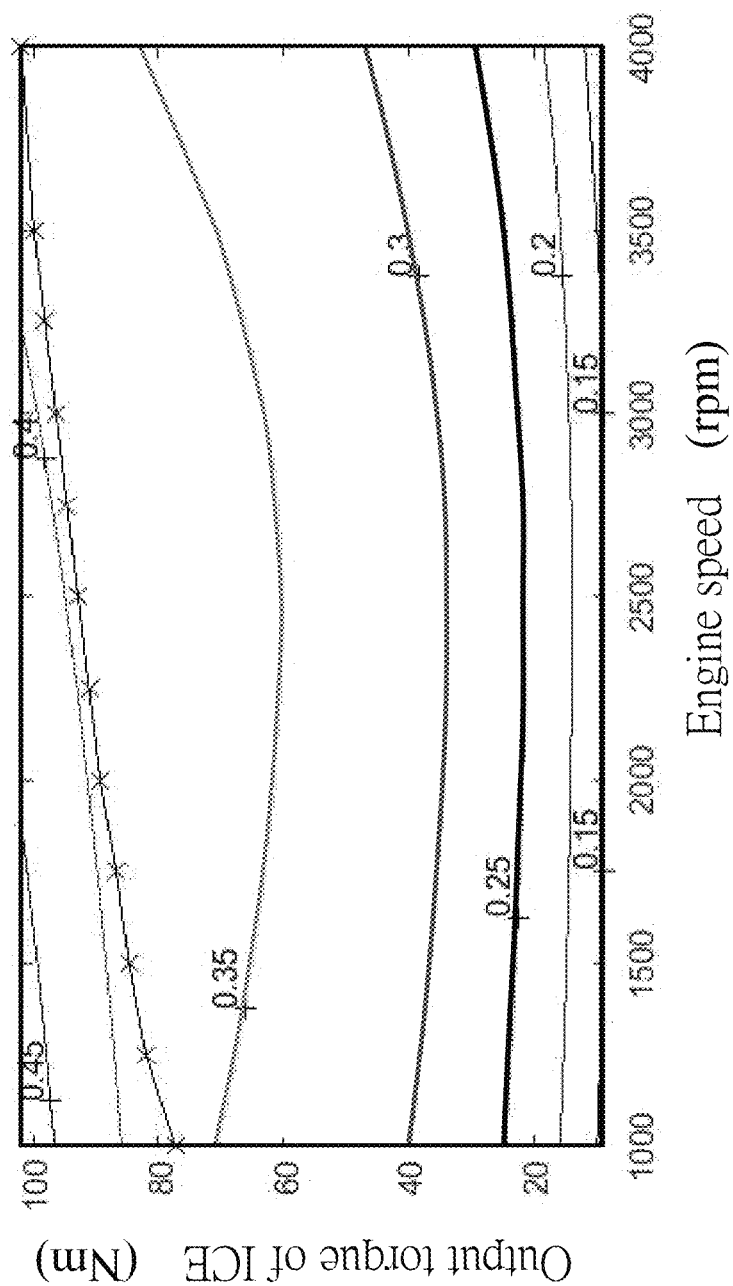
FIG. 6 is a schematic diagram illustrating an embodiment of a contour map of engine efficiency of an internal combustion engine (ICE) of the vehicle.
Figure 7:
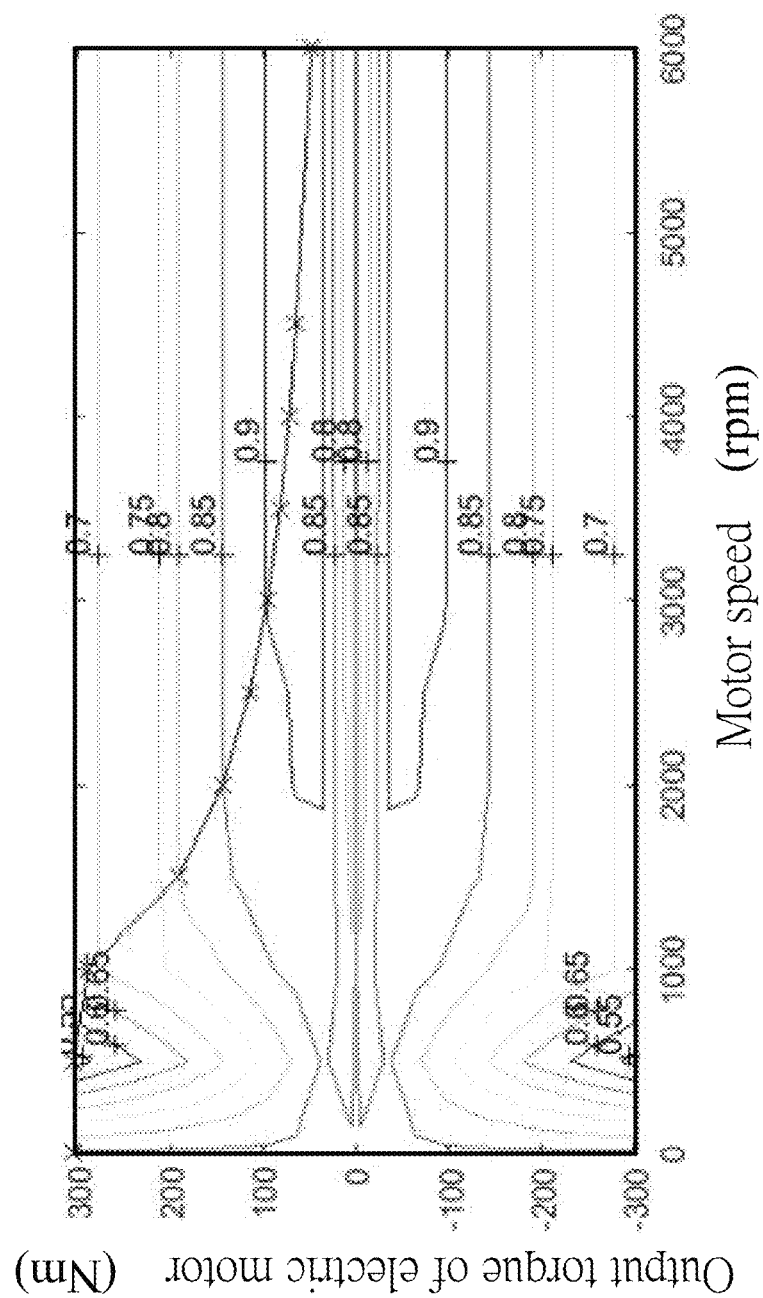
FIG. 7 is a schematic diagram illustrating an embodiment of a contour map of motor efficiency of an electric motor of the vehicle.
Figure 8:
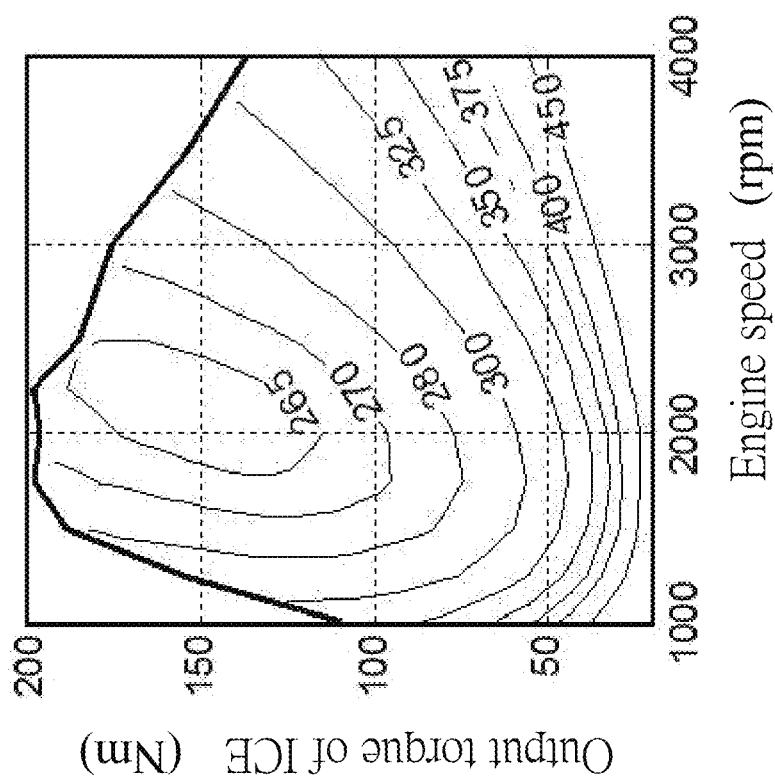
FIG. 8 is a schematic diagram illustrating an embodiment of a contour map of brake specific fuel consumption (BSFC) of the ICE of the vehicle.

To solve the object function J mentioned above, in step S33, the processing module 14 receives the object function J from the object function determination module 12. Moreover, based on the configuration of the powering unit and the energy unit, the processing module 14 obtains from the storage 103 the predetermined ranges respectively of the system parameters and the characteristics information that is related to the powering unit and the energy unit. The characteristics information and the predetermined ranges of the system parameters are stored in advance in the storage 13. In this embodiment, since the powering unit includes the ICE 103 and the electric motor 104 and since the energy unit includes the fuel source 101 and the battery source 102, the processing module 14 obtains the characteristics information which contains the LHV of the fuel used by the ICE 103, data of the BSFC of the ICE 103 that is related to the output torque of the ICE 103 and the engine speed $\omega_e$ of the ICE 103, data of the engine efficiency $\eta_e$, data of the motor efficiency $\eta_m$, the threshold value for the output torque of the ICE 103, the threshold value for the output torque of the electric motor 104, a function that maps the SOC of the battery source 102 to the weight factor f(SOC) as exemplarily shown in FIG. 5, and data of the discharge efficiency $\eta_b$ of the battery source 102 that is related to the SOC of the battery source 102 (e.g., a function that maps the SOC to the discharge efficiency $\eta_b$ of the battery source 102 as exemplarily shown in FIG. 9). The data of the BSFC of the ICE 103 may be a contour map of the BSFC of the ICE 103 of the vehicle 100 as shown in FIG. 8, but is not limited thereto. The data of the engine efficiency $\eta_e$ may be a contour map of the engine efficiency $\eta_e$ of the ICE 103 as shown in FIG. 6, but is not limited thereto. The data of the motor efficiency $\eta_m$ may be a contour map of the motor efficiency $\eta_m$ as shown in FIG. 7, but is not limited thereto. The predetermined ranges of the system parameters may be "0 kW$\leq P_d \leq$10 kW", "0%$\leq$SOC$\leq$100%", "0 rpm$\leq \omega_e \leq$4000 rpm", "0 rpm$\leq \omega_m \leq$6000 rpm" and "0$\leq \alpha \leq$1", but are not limited thereto. It is worth to note that in FIG. 5, the weight factor f(SOC) falls from 4 to a value of around 0.75 as the SOC of the battery source 102 rises from 30% to around 70%. That is to say, the weight factor f(SOC) is relatively low when the SOC of the battery source 102 (i.e., the residual capacity of the lithium battery) is high, so the contribution of the equivalent fuel consumption $\dot{m}_b$ of the battery source 102 to the total equivalent energy consumption of the vehicle 100 which is represented by the object function J is reduced. In contrast, the weight factor f(SOC) is relatively high when the SOC of the battery source 102 is low, so the contribution of the equivalent fuel consumption $\dot{m}_b$ to the total equivalent energy consumption is augmented.

Figure 4:
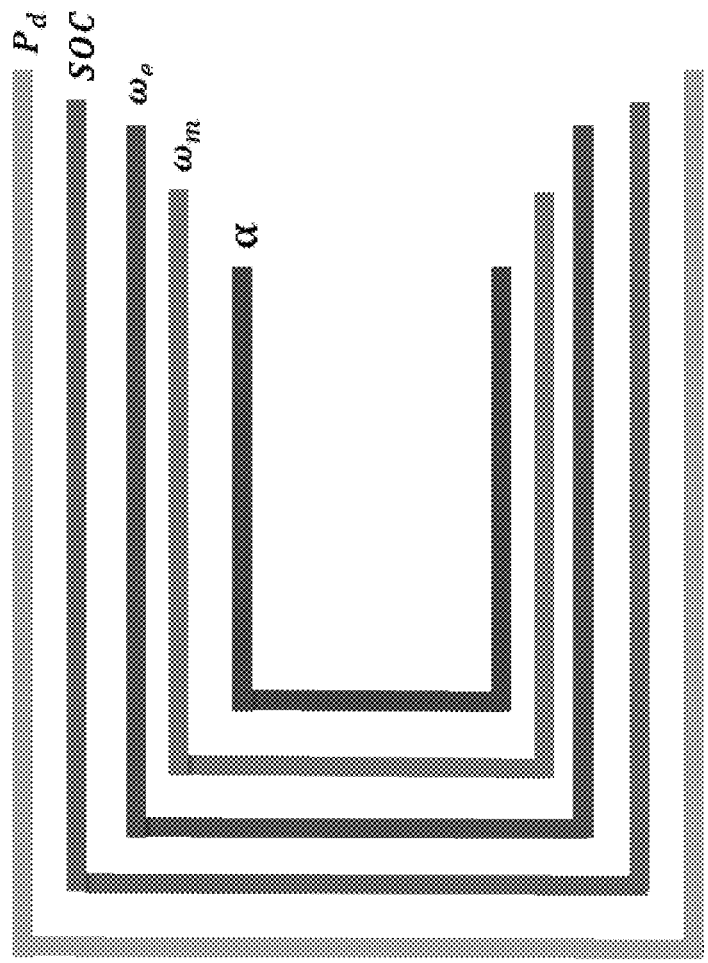
FIG. 4 is a schematic diagram illustrating an embodiment of an algorithm of nested-loops for calculating function values of an object function in the method according to the disclosure.

In step S34, by way of an algorithm of nested-loops with its general idea being exemplarily shown in FIG. 4 and based on the characteristics information and the predetermined ranges of the system parameters, the processing module 14 calculates the function values of the object function J each corresponding to a respective one of multiple parameter value sets each containing corresponding parameter values, where each of the parameter values in any parameter value set is a value of a respective one of the system parameters, so as to establish the database 15 which records the function values and the corresponding parameter value sets.

For one of the system parameters, discretization of the corresponding predetermined range to result in N number of the parameter values is exemplarily realized by uniformly dividing the predetermined range to result in N number of discrete points, where N is an integer determined based on demand. For example, if N=11, the predetermined range of the system parameter of the demanded power $P_d$, which was previously exemplarily defined as "0 kW≤$P_d$≤10 kW", can be uniformly divided to obtain eleven parameter values, i.e., 0, 1, 2, . . . , 10. For each of the function values, the corresponding parameter value set is a combination of the parameter values of the system parameters $P_d$, SOC, $\omega_e$, $\omega_m$ and α respectively selected from the predetermined ranges of the system parameters $P_d$, SOC, $\omega_e$, $\omega_m$ and α. Therefore, when the predetermined ranges of the system parameters, i.e., "0 kW≤$P_d$≤10 kW", "0%≤SOC≤100%", "0 rpm≤$\omega_e$≤4000 rpm", "0 rpm≤$\omega_m$≤6000 rpm" and "0≤α≤1", are each uniformly divided to obtain eleven parameter values for the corresponding system parameter, the function values contained in the database 15 are $11^5$ in number overall, and the parameter value sets contained in the database 15 are also $11^5$ in number overall. However, implementation of discretization of the predetermined ranges of the system parameters is not limited to the disclosure herein and may vary in other embodiments.

For each of the parameter value sets (i.e., a combination of parameter values, each of a respective one of the system parameters $P_d$, SOC, $\omega_e$, $\omega_m$ and α), to calculate the corresponding one of the function values of the object function J, the processing module 14 calculates a value of the output power $P_e$ of the ICE 103 according to $P_e = \alpha \times P_d$, calculates a value of the output torque $T_e$ of the ICE 103 according to $$T_e = \frac{P_e}{\omega_e},$$

obtains the engine efficiency $\eta_e$ by directly looking it up in the data of the engine efficiency $\eta_e$ (e.g., the contour map of the engine efficiency $\eta_e$ of the ICE 103 as shown in FIG. 6) contained in the characteristics information based on the parameter value of the engine speed $\omega_e$ of the ICE 103 and the value of the output torque $T_e$ of the ICE 103 or by means of interpolation with reference to the data of the engine efficiency $\eta_e$ contained in the characteristics information, the parameter value of the engine speed $\omega_e$ of the ICE 103 and the value of the output torque $T_e$ of the ICE 103, and calculates a part of the object function J, $$\frac{\alpha \times P_d}{\eta_e \times LHV},$$

by applying thereinto the parameter values of the relevant system parameters (namely, the power split ratio α and the demanded power $P_d$), and the engine efficiency $\eta_e$ and the LHV of the fuel used by the ICE 103 as contained in the characteristics information. In addition, the processing module 14 calculates a value of the output power $P_m$ of the electric motor 104 according to $P_m = (1-\alpha) \times P_d$, calculates a value of the output torque $T_m$ of the electric motor 104 according to $$T_m = \frac{P_m}{\omega_m},$$

obtains the motor efficiency $\eta_m$ by directly looking it up in the data of the motor efficiency $\eta_m$ (e.g., the contour map of the motor efficiency $\eta_m$ of the electric motor as shown in FIG. 7) contained in the characteristics information based on the parameter value of the motor speed $\omega_m$ of the electric motor 104 and the value of the output torque $T_m$ of the electric motor 104 or by means of interpolation with reference to the data of the motor efficiency $\eta_m$ contained in the characteristics information, the parameter value of the motor speed $\omega_m$ of the electric motor 104 and the value of the output torque $T_m$ of the electric motor 104, obtains the average of values of the BSFC $BSFC_{avg}$ by directly looking it up in the data of BSFC of the ICE 103 (e.g., the contour map of BSFC of the ICE 103 as shown in FIG. 8) contained in the characteristics information based on the parameter value of the engine speed $\omega_e$ of the ICE 103 and the value of the output torque $T_e$ of the ICE 103 or by means of interpolation with reference to the data of BSFC of the ICE 103 contained in the characteristics information, the parameter value of the engine speed $\omega_e$ of the ICE 103 and the value of the output torque $T_e$ of the ICE 103, obtains the discharge efficiency $\eta_b$ by directly looking it up in the function that maps the SOC of the battery source 102 to the discharge efficiency $\eta_b$ of the battery source 102 (e.g., FIG. 9) contained in the characteristics information based on the system parameter of the SOC of the battery source 102 or by means of interpolation with reference to the function that maps the SOC of the battery source 102 to the discharge efficiency $\eta_b$ of the battery source 102, as contained in the characteristics information, and the system parameter of the SOC of the battery source 102, obtains the weight factor f(SOC) by directly looking it up in the function that maps the SOC of the battery source 102 to the weight factor f(SOC) (e.g., FIG. 5) contained in the characteristics information based on the system parameter of the SOC of the battery source 102 or by means of interpolation with reference to the function that maps the SOC of the battery source 102 to the weight factor f(SOC) contained in the characteristics information and the system parameter of the SOC of the battery source 102, and calculates another part of the object function J, $$f(SOC) \times \frac{\frac{(1-\alpha) \times P_d}{\eta_m} \times BSFC_{avg}}{3600 \times \eta_b},$$

by applying thereinto the parameter values of the relevant system parameters (namely, the power split ratio α and the demanded power $P_d$), the motor efficiency $\eta_m$, the average of BSFC $BSFC_{avg}$, the discharge efficiency $\eta_b$ and the weight factor f(SOC). Moreover, the processing module 14 determines the penalty value $\gamma_p$ based on the output torque $T_e$ of the ICE 103, the output torque $T_m$ of the electric motor 104, and the threshold values therefor that are contained in the characteristics information. Subsequently, the processing module 14 calculates the function value of the object function J according to $$J(P_d, SOC, \omega_e, \omega_m, \alpha) = \frac{\alpha \times P_d}{\eta_e \times LHV} + f(SOC) \times \frac{\frac{(1-\alpha) \times P_d}{\eta_m} \times BSFC_{avg}}{3600 \times \eta_b} + \gamma_p$$

based on the values of the parts of the object function J, $$\frac{\alpha \times P_d}{\eta_e \times LHV}$$

and $$f(SOC) \times \frac{\frac{(1-\alpha) \times P_d}{\eta_m} \times BSFC_{avg}}{3600 \times \eta_b},$$

thus calculated and the penalty value $\gamma_p$ thus determined.

In step S35, after receiving a condition signal which may be transmitted by the VCU and which specifies the current conditions of the powering unit and the energy unit, and receiving the value of demanded power $P_d$ of the vehicle 100, the search module 16 determines the smallest function value J* among the function values in the database 15 that correspond to those of the parameter value sets that contain the parameter values which meet the current conditions of the powering unit and the energy unit and which correspond to the value of demanded power $P_d$ of the vehicle 100. In this embodiment, the current conditions of the powering unit and the energy unit include a current value of the engine speed $\omega_e$ of the ICE 103, a current value of the motor speed $\omega_m$ of the electric motor 104 and a current value of the SOC of the battery source 102. In other words, in the parameter value set corresponding to the smallest function value J*, the parameter value of the engine speed $\omega_e$ of the ICE 103, the parameter value of the motor speed $\omega_m$ of the electric motor 104, the parameter value of the SOC of the battery source 102 and the parameter value of the demanded power $P_d$ respectively match the current value of the engine speed $\omega_e$ of the ICE 103, the current value of the motor speed $\omega_m$ of the electric motor 104, the current value of the SOC of the battery source 102 and the value of the demanded power $P_d$ of the vehicle 100 specified by the condition signal.

Subsequently, the search module 16 determines the optimum power split ratio $\alpha^*$ based on the parameter value set corresponding to the smallest function value J* for energy management of the vehicle 100. In this embodiment, the search module 16 makes the parameter value of the power split ratio $\alpha$ that is contained in the parameter value set corresponding to the smallest function value J* serve as the optimum power split ratio $\alpha^*$ for management of power distribution between the ICE 103 and the electric motor 104. It should be noted that the smallest function value J* and the corresponding parameter value set in the database 15 are determined by one of a direct search algorithm and an interpolation search algorithm, where the direct search algorithm is used when one combination of the parameter values in the database 15 can be found to be a perfect match for the current conditions of the ICE 103 and the electric motor 104 and the value of demanded power $P_d$, and the interpolation search algorithm is used when no combination of the parameter values in the database 15 can be found to exactly match the current conditions of the ICE 103 and the electric motor 104 or the value of demanded power $P_d$. Since implementations of the direct search algorithm and the interpolation search algorithm are well known to one skilled in the relevant art, detailed explanation of the same is omitted herein for the sake of brevity.

For example, when the value of the demanded power $P_d$ of the vehicle 100, the current value of the SOC of the battery source 102, the current value of the engine speed $\omega_e$ of the ICE 103 and the current value of the motor speed $\omega_m$ of the electric motor 104 are respectively a, b, c, and d, the smallest function value J* can be expressed as J*=J(a,b,c,d,$\alpha^*$)=min [J(a,b,c,d)], where J(a,b,c,d) represents a set of those of the function values of the object function J that correspond to the parameter values of the system parameters ($P_d$=a,SOC=b,$\omega_e$=c,$\omega_m$=d.

In this embodiment, after the optimum power split ratio $\alpha^*$ has been determined, the search module 16 transmits the same to the VCU for further control, such as setting the power distribution between the ICE 103 and the electric motor 104 to the optimum power split ratio $\alpha^*$.

Figure 10:
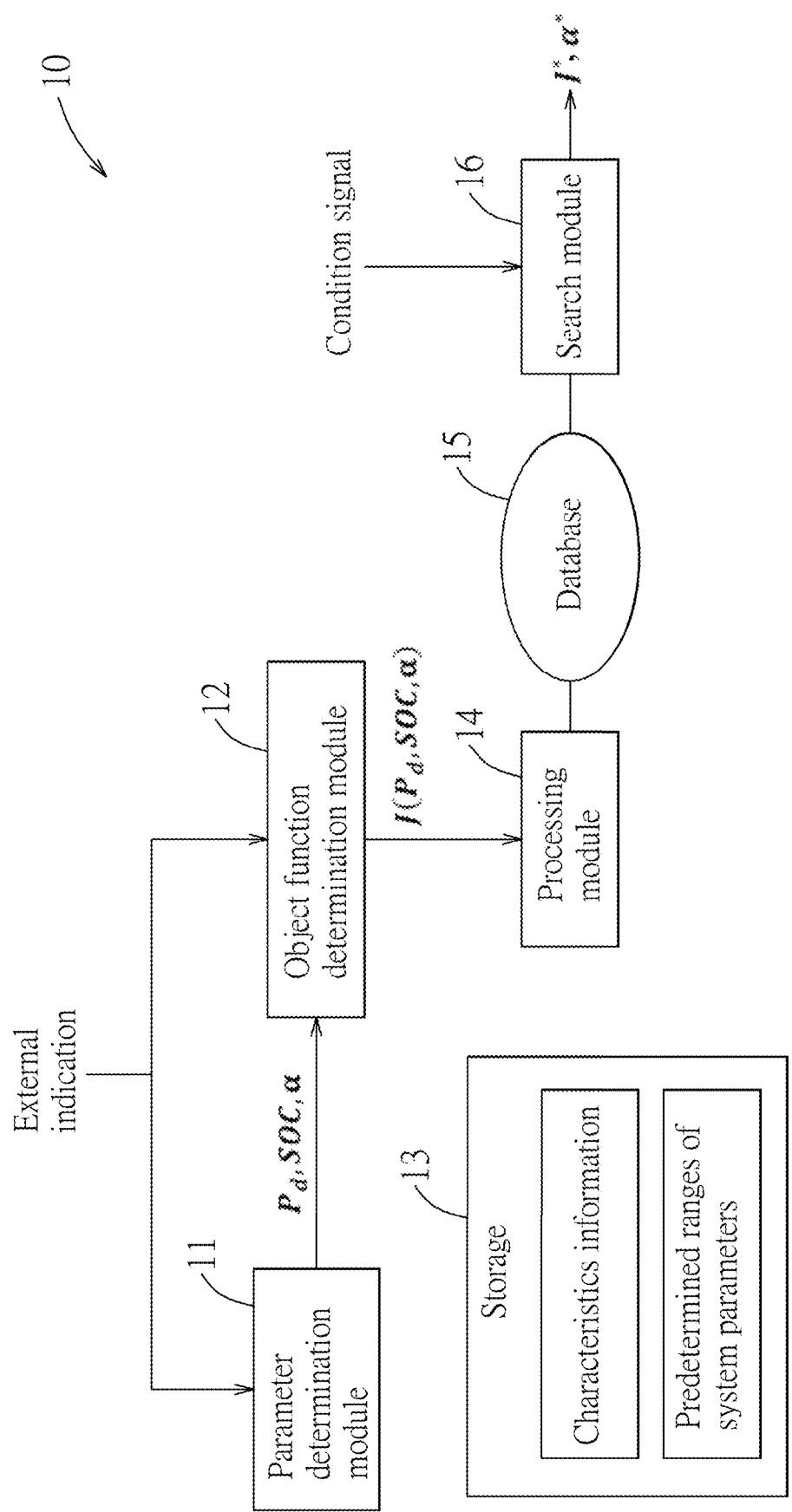
FIG. 10 is a block diagram illustrating a second embodiment of the computer system for energy management according to the disclosure.
Figure 11:
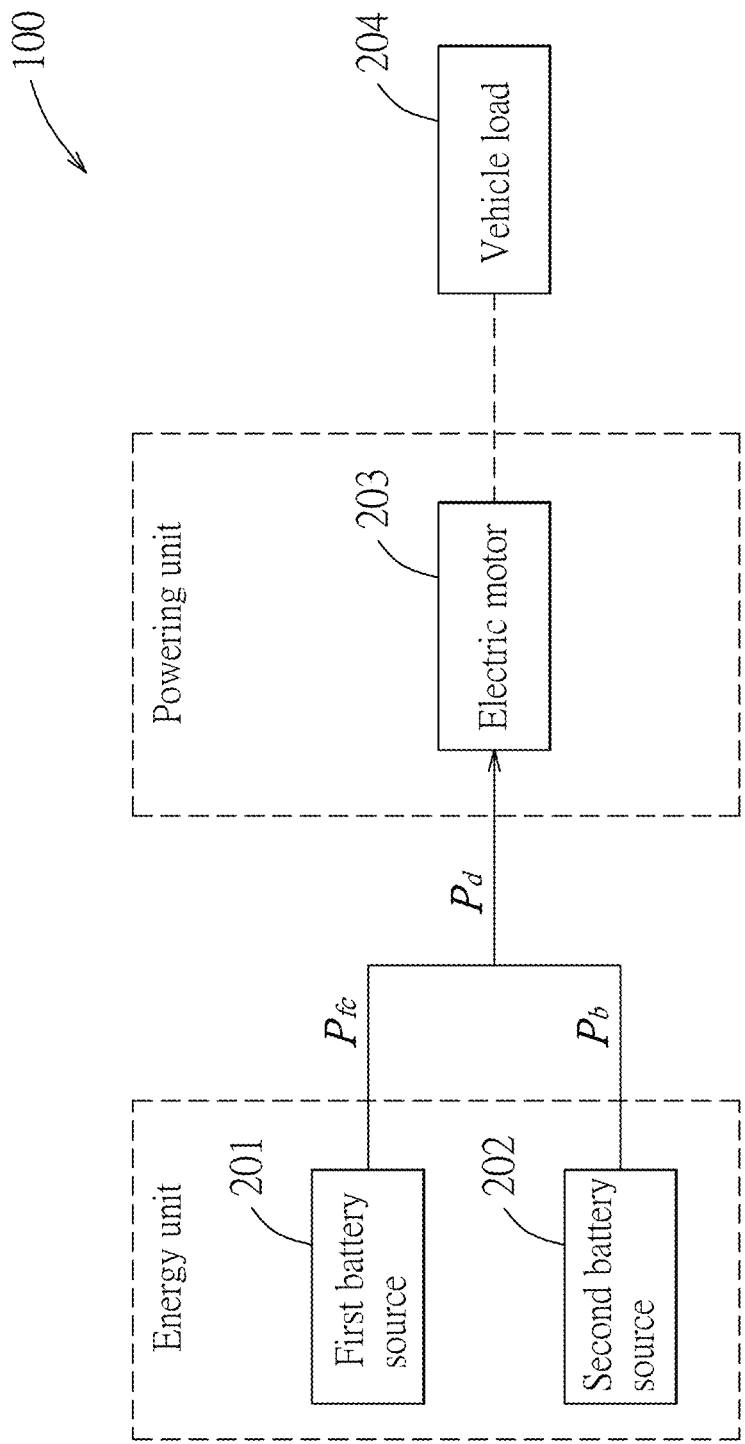
FIG. 11 is a block diagram illustrating another embodiment of the vehicle.

Referring to FIGS. 10 and 11, a second embodiment of the computer system 10 for energy management to be utilized on a vehicle 100 with multiple energy sources is illustrated. The second embodiment of the computer system 10 is similar to the first embodiment, but is different in what are described below.

In this embodiment, the vehicle 100 is a battery electric vehicle (BEV), and includes a vehicle load 204, a powering unit that drives the vehicle load 204, and an energy unit that supplies energy to the powering unit. The powering unit includes an electric motor 203 alone. The energy unit includes a first battery source 201 and a second battery source 202 that are different ones selected from a group consisting of a lithium battery, a fuel cell and a supercapacitor (SC). In this embodiment, the first battery source 201 is a fuel cell, and the second battery source 202 is a lithium battery.

Specifically speaking, the first battery source 201 supplies electrical energy to the electric motor 203 with output power $P_{fc}$ and the second battery source 202 supplies electrical energy to the electric motor 203 with output power $P_b$, and the electrical energy from the first battery source 201 and the second battery source 202 is supplied to the electric motor 203 with demanded power $P_d$. In other words, a sum of the output power $P_{fc}$ of the first battery source 201 and the output power $P_b$ of the second battery source 202 is equal to the demanded power $P_d$ received by the electric motor 203, i.e., $P_d = P_{fc} + P_b$.

A second embodiment of the method of energy management according to the disclosure is adapted to be implemented by the second embodiment of the computer system 10. The second embodiment of the method of energy management also includes step S31 to S35 shown in FIG. 3 and detailed implementations of these steps are described below.

In step S31, since the powering unit only includes the electric motor 203, and the energy unit includes the fuel cell and the lithium battery (these are the configuration of the powering unit and the energy unit) the system parameters decided by the parameter determination module 11 merely include the demanded power $P_d$, a SOC of the second battery source 202, and a power split ratio $\alpha$ that relates to power contribution between the first battery source 201 and the second battery source 202. For example, the power split ratio $\alpha$ with a value of 0.3 indicates that the power distribution between the first battery source 201 and the second battery source 202 is 3 to 7.

According to equation $P_d = P_{fc} + P_b$, the output power $P_{fc}$ of the first battery source 201 and the output power $P_b$ of the second battery source 202 can be rewritten respectively as:

$$P_{fc} = \alpha \times P_d; \text{ and}$$

$$P_b = (1-\alpha) \times P_d.$$

In step S32, considering that the powering unit only includes the electric motor 203, and that the energy unit includes the fuel cell and the lithium battery, the object function J determined by the object function determination module 12 is $J(P_d, SOC, \alpha) = \dot{m}_{b1} + f(SOC) \times \dot{m}_{b2} + \gamma_p$, where $\dot{m}_{b1}$ represents actual energy consumption of the first battery source 201, $\dot{m}_{b2}$ represents equivalent energy consumption of the second battery source 202, f(SOC) represents a weight factor of the equivalent energy consumption of the second battery source 202 and is a function value of the SOC, and $\gamma_p$ represents a penalty value that is related to a threshold value for the output power $P_{fc}$ of the first battery source 201 and a threshold value for the output power $P_b$ of the second battery source 202.

The penalty value $\gamma_p$ is decided based on an operating status of the energy unit (i.e., the output power $P_{fc}$ of the first battery source 201 and the output power $P_b$ of the second battery source 202), and serves as an indicator as to whether or not the energy unit is operating normally. In this embodiment, the penalty value $\gamma_p$ is equal to zero when a value of the output power $P_{fc}$ of the first battery source 201 is not greater than the threshold value therefor and a value of the output power $P_b$ of the second battery source 202 is not greater than the threshold value therefor, and is equal to a predetermined value greater than zero (e.g., $10^6$, but is not limited thereto) when the value of any of the output power $P_{fc}$ of the first battery source 201 and the output power $P_b$ of the second battery source 202 is greater than the corresponding threshold value. That is to say, the penalty value $\gamma_p$ is equal to zero (i.e., $\gamma_p = 0$) when the energy unit is operating normally, and is equal to the predetermined value (i.e., $\gamma_p = 10^6$) when the energy unit is not operating normally.

In addition, the actual energy consumption of the first battery source 201 can be expressed as $$\dot{m}_{b1} = \frac{\alpha \times P_d}{\eta_{DC,b1}},$$

where $\eta_{DC,b1}$ represents DC/DC conversion efficiency of the first battery source 201. Similarly, the equivalent energy consumption of the second battery source 202 can be expressed as $$\dot{m}_{b2} = \frac{(1-\alpha) \times P_d}{\eta_{b2} \times \eta_{DC,b2}},$$

where $\eta_{DC,b2}$ represents DC/DC conversion efficiency of the second battery source 202, and $\eta_{b2}$ represents discharge efficiency of the second battery source 202.

Consequently, the object function J can be rewritten as $$J(P_d, SOC, \alpha) = \frac{\alpha \times P_d}{\eta_{DC,b1}} + f(SOC) \times \frac{(1-\alpha) \times P_d}{\eta_{b2} \times \eta_{DC,b2}} + \gamma_p.$$

Figure 5:
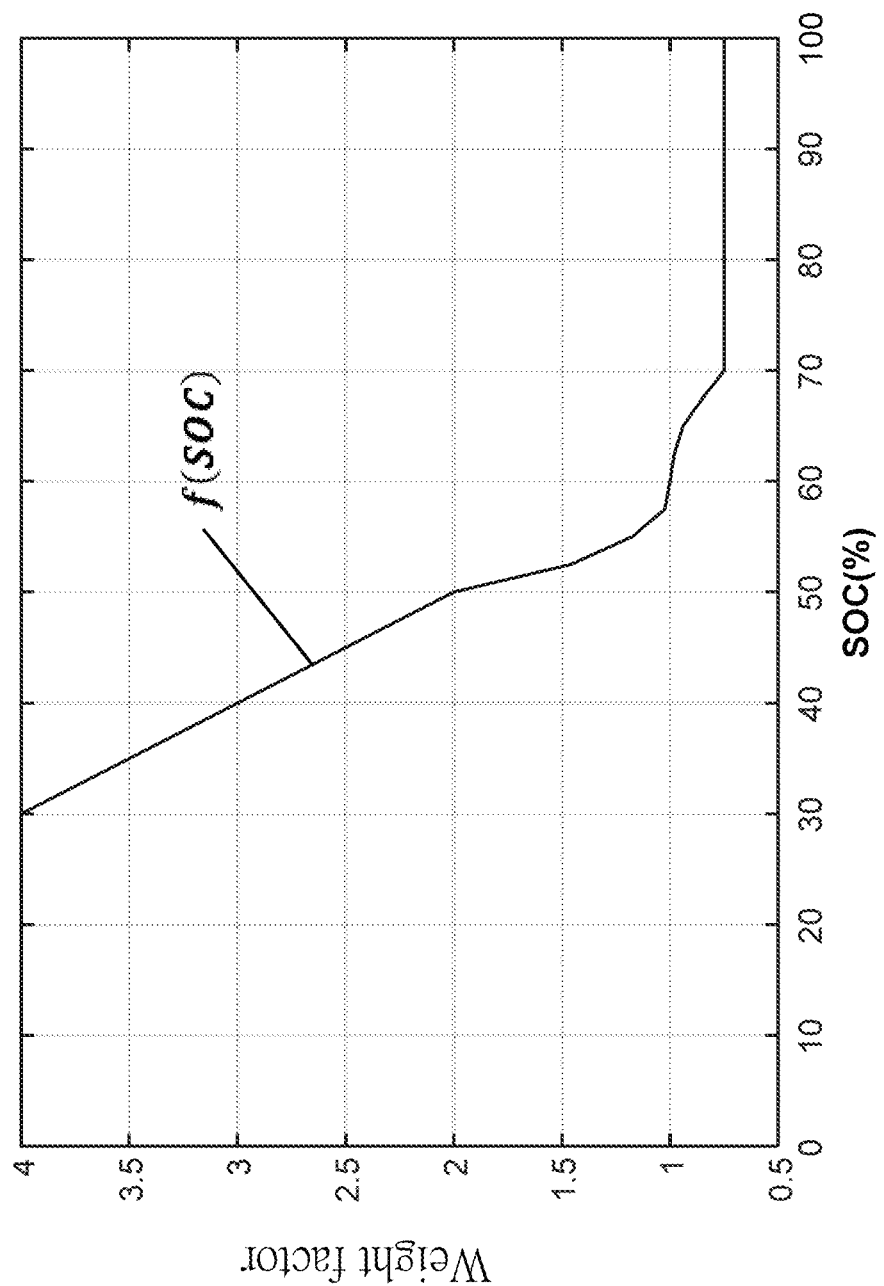
FIG. 5 is a schematic diagram illustrating an embodiment of a weight factor of equivalent fuel consumption of a battery source of the vehicle, where the weight factor is a function of a state of charge (SOC) of the battery source.
Figure 9:
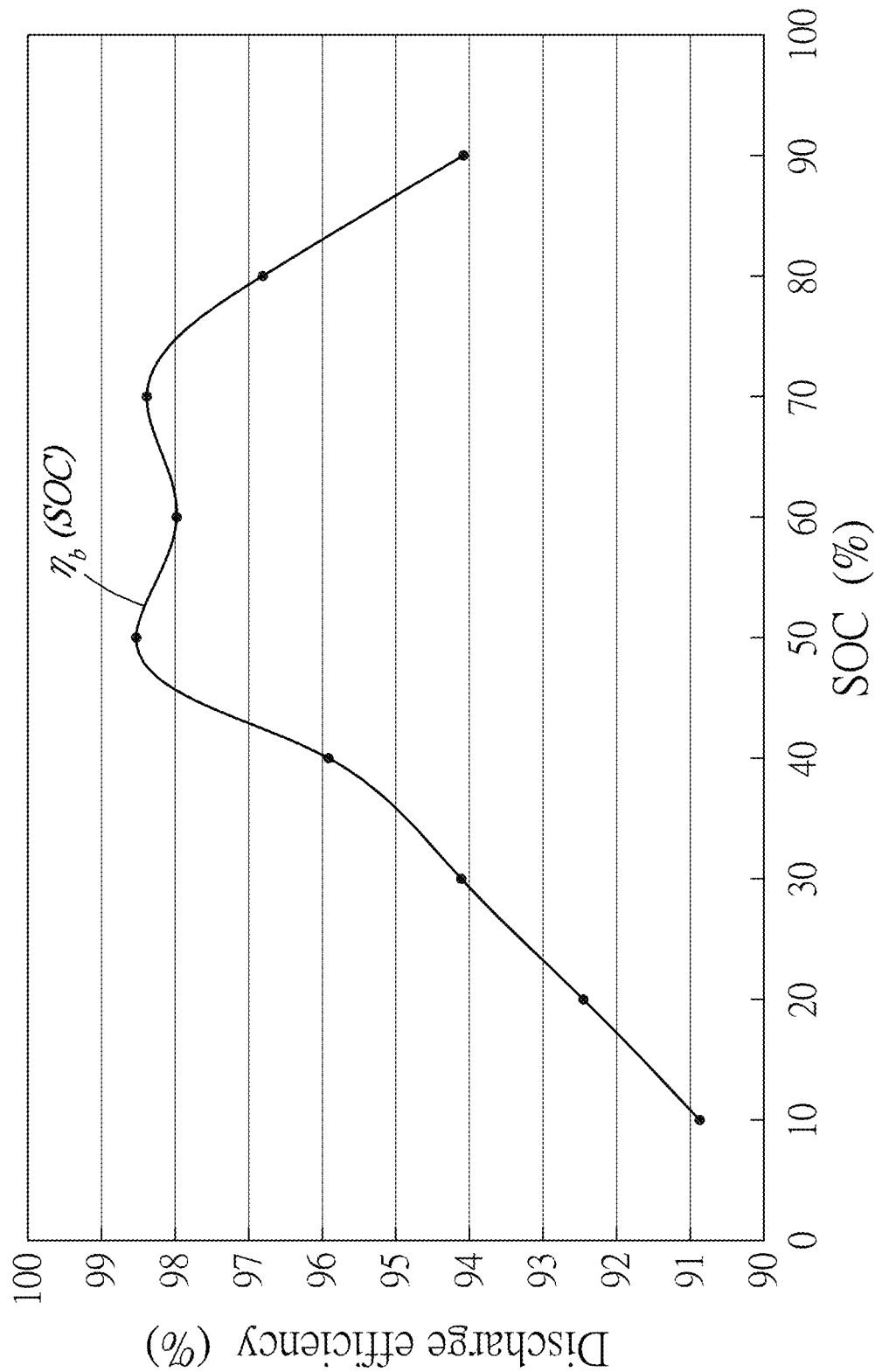
FIG. 9 is a schematic diagram illustrating an embodiment of a graph of a function that maps the SOC of the battery source to discharge efficiency of the battery source.
Figure 13:
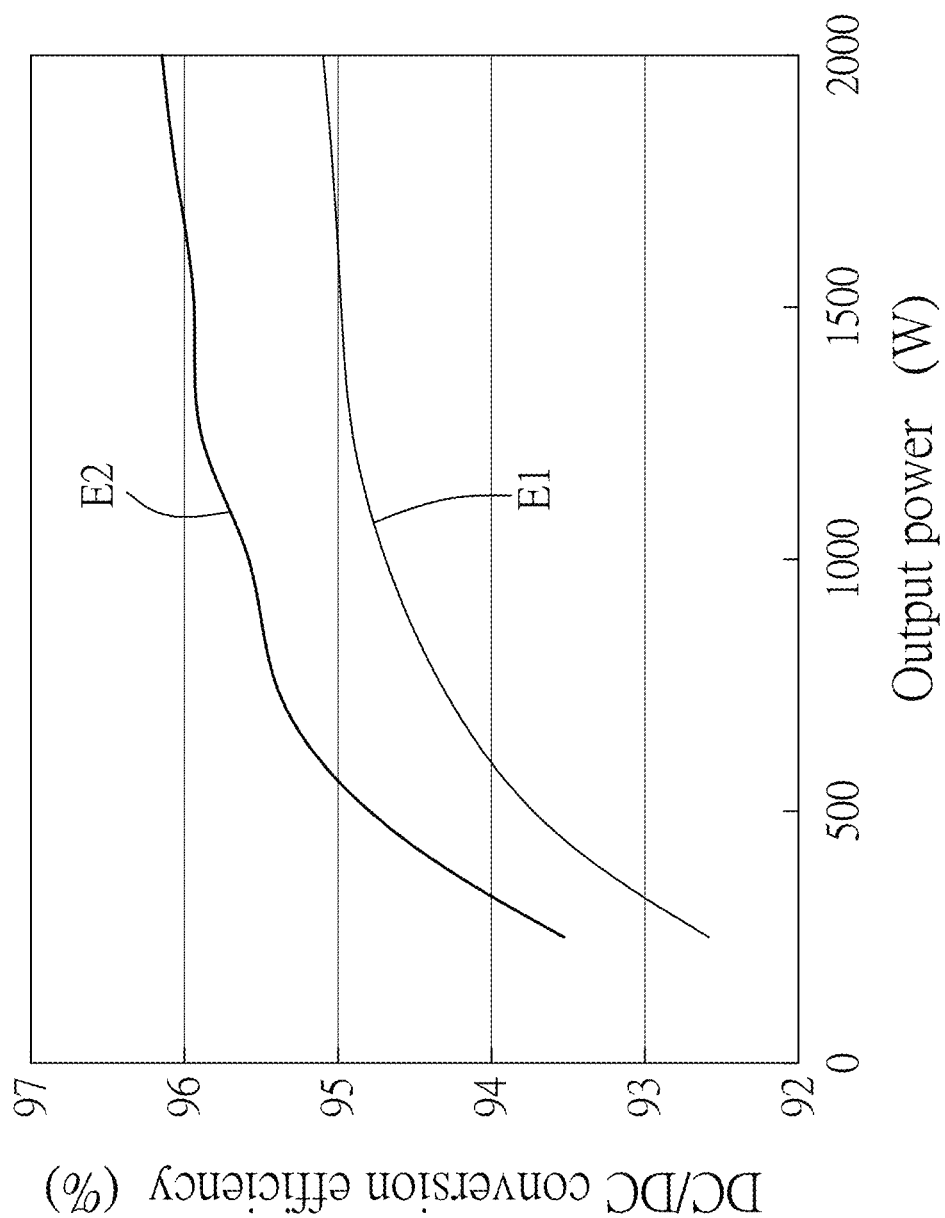
FIG. 13 is a schematic diagram illustrating an embodiment of a graph of functions that respectively map output power of a fuel cell and output power of a lithium battery to DC/DC conversion efficiency.

To solve the object function J mentioned above, in step S33, the processing module 14 obtains the characteristics information from the storage 13 that contains the threshold value for the output power $P_{fc}$ of the first battery source 201, the threshold value for the output power $P_b$ of the second battery source 202, data of the DC/DC conversion efficiency $\eta_{DC,b1}$ of the first battery source 201 such as a function (E1) that maps the output power $P_{fc}$ of the first battery source 201 to the DC/DC conversion efficiency $\eta_{DC,b1}$ of the first battery source 201 as exemplarily shown in FIG. 13, data of the DC/DC conversion efficiency $\eta_{DC,b2}$ of the second battery source 202 such as a function (E2) that maps the output power $P_b$ of the second battery source 202 to the DC/DC conversion efficiency $\eta_{DC,b2}$ of the second battery source 202 as exemplarily shown in FIG. 13, data of the discharge efficiency $\eta_{b2}$ of the second battery source 202 such as a function that maps the SOC of the second battery source 202 to the discharge efficiency $\eta_{b2}$ of the second battery source 202 as exemplarily shown in FIG. 9, and a function that maps the SOC of the second battery source 202 to the weight factor f(SOC) as exemplarily shown in FIG. 5. The predetermined ranges of the system parameters obtained by the processing module 14 from the storage 13, namely the predetermined ranges of the demanded power $P_d$, the SOC of the second battery source 202 and the power split ratio $\alpha$, may be "0 kW $\leq P_d \leq$ 3 kW", "00% $\leq$ SOC $\leq$ 100%" and "0 $\leq \alpha \leq$ 1", respectively, but are not limited thereto.

Figure 12:
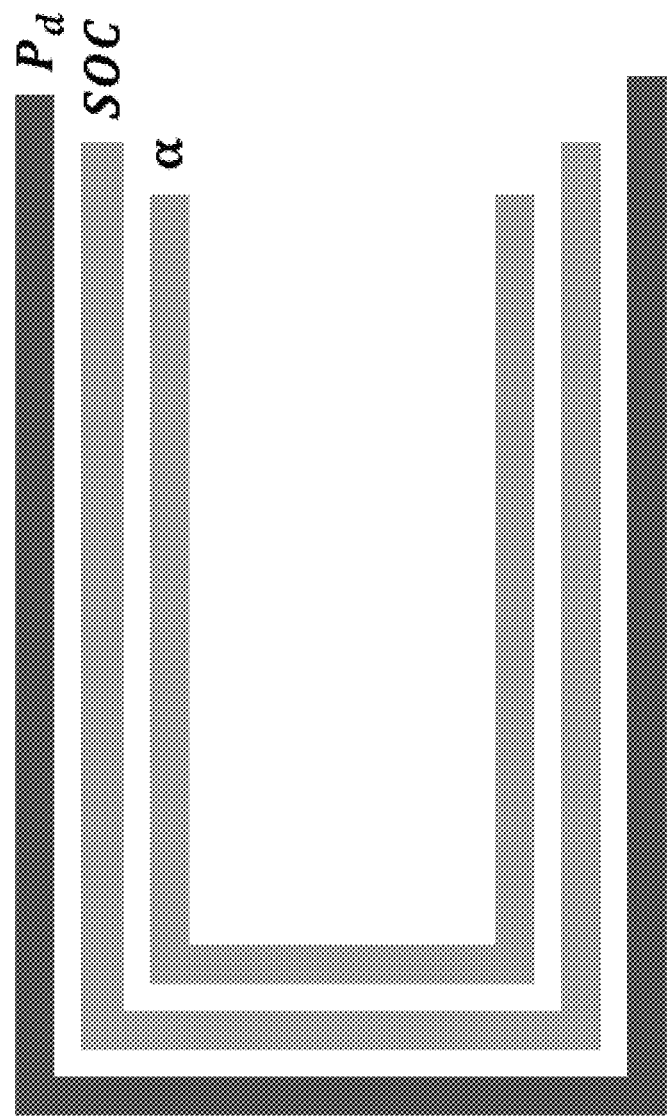
FIG. 12 is a schematic diagram illustrating an algorithm of nested-loops for calculating function values of the object function in a second embodiment of the method according to the disclosure.

In step S34, by way of an algorithm of nested-loops with its general idea being exemplarily shown in FIG. 12 and based on the characteristics information and the predetermined ranges of the system parameters, the processing module 14 calculates the function values of the object function J each corresponding to a respective one of multiple parameter value sets each containing corresponding parameter values, where each of the parameter values in any parameter value set is a value of a respective one of the system parameters, so as to establish the database 15 which records the function values and the corresponding parameter value sets. For each of the system parameters, since how the discretization is performed on the corresponding predetermined range to result in N number of the parameter values has been discussed above, detailed description of the same is omitted herein for the sake of brevity.

For each of the parameter value sets (i.e., a combination of the parameter values of the system parameters $P_d$, SOC and $\alpha$), to calculate the corresponding one of the function values of the object function J, the processing module 14 calculates a value of the output power $P_{fc}$ of the first battery source 201 according to $P_{fc} = \alpha \times P_d$, obtains the DC/DC conversion efficiency $\eta_{DC,b1}$ of the first battery source 201 by directly looking it up in the function (E1) that maps the output power $P_{fc}$ of the first battery source 201 to the DC/DC conversion efficiency $\eta_{DC,b1}$ of the first battery source 201 (e.g., FIG. 13), as contained in the characteristics information, based on the output power $P_{fc}$ of the first battery source 201 or by means of interpolation with reference to the function (E1) that maps the output power $P_{fc}$ of the first battery source 201 to the DC/DC conversion efficiency $\eta_{DC,b1}$ of the first battery source 201, as contained in the characteristics information, and the output power $P_{fc}$ of the first battery source 201, and calculates a part of the object function J, $$\frac{\alpha \times P_d}{\eta_{DC,b1}},$$

by applying thereinto the parameter values of the relevant system parameters (namely, the power split ratio $\alpha$ and the demanded power $P_d$), and the DC/DC conversion efficiency $\eta_{DC,b1}$ of the first battery source 201. In addition, the processing module 14 calculates a value of the output power $P_b$ of the second battery source 202 according to $P_b = (1-\alpha) \times P_d$, obtains the discharge efficiency $\eta_{b2}$ of the second battery source 202 via the function that maps the SOC of the second battery source 202 to the discharge efficiency $\eta_{b2}$ of the second battery source 202 (e.g., FIG. 9) contained in the characteristics information based on the system parameter of the SOC of the second battery source 202, obtains the DC/DC conversion efficiency $\eta_{DC,b2}$ of the second battery source 202 by directly looking it up in the function (E2) that maps the output power $P_b$ of the second battery source 202 to the DC/DC conversion efficiency $\eta_{DC,b2}$ of the second battery source 202 (e.g., FIG. 13), as contained in the characteristics information, based on the output power $P_b$ of the second battery source 202 or by means of interpolation with reference to the function (E2) that maps the output power $P_b$ of the second battery source 202 to the DC/DC conversion efficiency $\eta_{DC,b2}$ of the second battery source 202, as contained in the characteristics information, and the output power $P_b$ of the second battery source 202, obtains the weight factor f(SOC) by directly looking it up in the function that maps the SOC of the second battery source 202 to the weight factor f(SOC) (e.g., FIG. 5), as contained in the characteristics information, based on the system parameter of the SOC of the second battery source 202 or by means of interpolation with reference to the function that maps the SOC of the second battery source 202 to the weight factor f(SOC), as contained in the characteristics information, and the system parameter of the SOC of the second battery source 202, and calculates another part of the object function J, $$f(SOC) \times \frac{(1-\alpha) \times P_d}{\eta_{b2} \times \eta_{DC,b2}},$$

by applying thereinto the parameter values of the relevant system parameters (the power split ratio $\alpha$ and the demanded power $P_d$), the discharge efficiency $\eta_{b2}$, the DC/DC conversion efficiency $\eta_{DC,b2}$ of the second battery source 202, and the weight factor f(SOC). Moreover, the processing module 14 determines the penalty value $\gamma_p$ based on the output power $P_{fc}$ of the first battery source 201, the output power $P_b$ of the second battery source 202, and the threshold values therefor as contained in the characteristics information. Subsequently, the processing module 14 calculates the function value of the object function J according to $$J(P_d, SOC, \alpha) = \frac{\alpha \times P_d}{\eta_{DC,b1}} + f(SOC) \times \frac{(1-\alpha) \times P_d}{\eta_{b2} \times \eta_{DC,b2}} + \gamma_p$$

based on the values of the parts of the object function J, $$\frac{\alpha \times P_d}{\eta_{DC,b1}} \text{ and } f(SOC) \times \frac{(1-\alpha) \times P_d}{\eta_{b2} \times \eta_{DC,b2}},$$

thus calculated and the penalty value $\gamma_p$ thus determined.

In step S35, after receiving the condition signal which specifies the current conditions of the powering unit and the energy unit, and the value of demanded power $P_d$ of the vehicle 100, the search module 16 determines, by the direct search algorithm and/or the interpolation search algorithm, the smallest function value J* among the function values in the database 15 that correspond to those of the parameter value sets that contain the parameter values which meet the current conditions of the powering unit and the energy unit, and which correspond to the value of demanded power $P_d$ of the vehicle 100. In this embodiment, the current conditions of the powering unit and the energy unit include a current value of the SOC of the second battery source 202. In other words, in the parameter value set corresponding to the smallest function value J*, the parameter value of the SOC of the second battery source 202 and the parameter value of the demanded power $P_d$ respectively match the current value of the SOC of the second battery source 202 and the value of the demanded power $P_d$ of the vehicle 100 specified by the condition signal.

Subsequently, the search module 16 makes the parameter value of the power split ratio $\alpha$ that is contained in the parameter value set corresponding to the smallest function value J* serve as the optimum power split ratio $\alpha$* for management of power distribution between the first battery source 201 and the second battery source 202.

For example, when the value of the demanded power $P_d$ of the vehicle 100 and the current value of the SOC of the second battery source 202 are respectively e and f, the smallest function value J* can be expressed as J*=J(e,f,$\alpha$*)=min[J(e,f)], where J(e,f) represents a set of those of the function values of the object function J that correspond to the parameter values of the system parameters ($P_d$=e, SOC=f).

In a variant of the second embodiment, the energy unit of the vehicle 100 further includes a third battery source (not shown) in addition to the first battery source 201 and the second battery source 202. In this embodiment, the first battery source 201, the second battery source 202 and the third battery source are respectively a fuel cell, a lithium battery and an SC. A sum of the output power $P_{fc}$ of the first battery source 201, the output power $P_b$ of the second battery source 202 and output power $P_{sc}$ of the third battery source is equal to the demanded power $P_d$ received by the electric motor 203, i.e., $P_d = P_{fc} + P_b + P_{sc}$. Moreover, the output power $P_{fc}$ of the first battery source 201, the output power $P_b$ of the second battery source 202 and the output power $P_{sc}$ of the third battery source can be expressed respectively as:

$$P_{fc} = \alpha \times P_d;$$

$$P_{sc} = \beta \times P_d; \text{ and}$$

$$P_b = (1-\alpha-\beta) \times P_d,$$

where power split ratios $\alpha$ and $\beta$ relate to power distribution among the first battery source 201, the second battery source 202 and the third battery source, and each range from zero to one. For example, the power split ratios $\alpha$ and $\beta$ with respective values of 0.3 and 0.5 indicate that the power distribution among the first battery source 201, the second battery source 202 and the third battery source is 3:5:2.

In this embodiment, the object function J determined by the object function determination module 12 is $J(P_d, SOC, \alpha, \beta) = [\dot{m}_{fc} + f(SOC) \times \dot{m}_b + \dot{m}_{sc}] + \gamma_p$, where $J(P_d, SOC, \alpha, \beta)$ represents a total equivalent hydrogen consumption of the vehicle 100, $\dot{m}_{fc}$ represents actual hydrogen consumption of the first battery source 201 (i.e., the fuel cell), $\dot{m}_b$ represents equivalent hydrogen consumption of the second battery source 202 (i.e., the lithium battery), $\dot{m}_{sc}$ represents equivalent hydrogen consumption of the third battery source (i.e., the SC), and $\gamma_p$ represents a penalty value that is related to a threshold value for the output power $P_{fc}$ of the first battery source 201, a threshold value for the output power $P_b$ of the second battery source 202, and a threshold value for the output power $P_{sc}$ of the third battery source.

The actual hydrogen consumption $\dot{m}_{fc}$ of the first battery source 201 can be expressed as $$\dot{m}_{fc} = A \times \frac{P_{fc}}{V_{fc}},$$

where $A=1.0445969\times10^5$ gram/Ampere is a constant representing an amount of hydrogen required to be consumed to generate an electric current of 1 ampere, and $V_{fc}$ represents output voltage of the first battery source 201. The equivalent hydrogen consumption $\dot{m}_b$ of the second battery source 202 is positively proportional to a discharge current $I_b$ of the second battery source 202, and the equivalent hydrogen consumption $\dot{m}_{sc}$ of the third battery source is positively proportional to a discharge current $I_{sc}$ of the third battery source. The discharge current $I_b$ of the second battery source 202 and the discharge current $I_{sc}$ of the third battery source flow to the electric motor 203, and can be represented respectively as:

$$I_b = \frac{v_{oc,b} - \sqrt{V_{oc,b}^2 - 4 \times P_b \times R_b}}{2 \times R_b}; \text{ and}$$

$$I_{sc} = \frac{v_{oc,sc} - \sqrt{v_{oc,sc}^2 - 4 \times P_{sc} \times R_{sc}}}{2 \times R_{sc}},$$

where $V_{oc,b}$ represents open-circuit voltage of the second battery source 202 and is a function of temperature $T_b$ and the SOC of the second battery source 202 (i.e., $V_{oc,b}=f(SOC, T_b)$), $R_b$ represents an equivalent internal resistance of the second battery source 202, $V_{oc,sc}$ represents open-circuit voltage of the third battery source and is a function of temperature $T_{sc}$ and the SOC of the third battery source (i.e., $V_{oc,sc}=f(SOC,T_{sc})$), $R_{sc}$ represents an equivalent internal resistance of the third battery source.

Therefore, the object function J determined by the object function determination module 12 can be expressed as:

$$J(P_d, SOC, \alpha, \beta) = \left[ A \times \frac{P_{fc}}{V_{fc}} + f(SOC) \times (A \times I_b) + A \times I_{sc} \right] + \gamma_p.$$

As already mentioned in previous embodiments of this disclosure, through establishing the database 15 in advance by calculating function values of the object function J for various value combinations of the system parameters (i.e., $P_d$, SOC, $\alpha$ and $\beta$) within the predetermined ranges, optimum power split ratios $\alpha^*$ and $\beta^*$ among the first battery source 201, the second battery source 202 and the third battery source can be determined based on the parameter value set corresponding to the smallest function value J* for energy management of the vehicle 100.

In summary, the computer system and the method of energy management according to the disclosure establish the database in advance by calculating function values of the object function corresponding multiple combinations of parameter values of the system parameters that fall within corresponding predetermined ranges based on the system parameters and the characteristics information. In this way, a minimum total equivalent energy consumption of the vehicle (i.e., the smallest function value J*) can be determined through looking it up in the database based on current conditions of the vehicle and demanded power of the vehicle, so as to decide the optimum power split ratio for energy management of the vehicle based on the parameter value set corresponding to the smallest function value J*. Therefore, energy management of the vehicle with multiple energy sources can be realized in real time.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of energy management to be utilized on a vehicle with multiple energy sources, the vehicle including a powering unit for driving a transmission mechanism of the vehicle, and an energy unit which supplies energy to the powering unit, the powering unit including an internal combustion engine (ICE) and an electric motor, the energy unit including a fuel source and a battery source that is one of a lithium battery, a fuel cell and a supercapacitor (SC), the method to be implemented by a computer system and comprising:

A) based on a configuration of the powering unit and the energy unit, deciding a plurality of system parameters that are related to the powering unit and the energy unit;

B) based on the system parameters thus decided and the configuration of the powering unit and the energy unit, determining an object function J that represents a total equivalent energy consumption of the vehicle and that is associated with the system parameters;

C) based on the configuration of the powering unit and the energy unit, obtaining characteristics information that is related to the powering unit and the energy unit, and obtaining a plurality of predetermined ranges respectively of the system parameters;

D) calculating, based on the characteristics information and the predetermined ranges of the system parameters, a plurality of function values of the object function J each corresponding to a respective one of multiple parameter value sets each containing corresponding parameter values, where for each of the parameter value sets, each of the parameter values contained therein is a value of a respective one of the system parameters, so as to establish a database that records the function values thus calculated and the respective parameter value sets, the parameter values contained in the parameter value sets being obtained by performing discretization on the predetermined ranges of the system parameters;
E) determining a smallest function value among the function values in the database that correspond to those of the parameter value sets that contain the parameter values which meet current conditions of the powering unit and the energy unit and which correspond to a value of demanded power $P_d$ of the vehicle, and determining an optimum power split ratio based on one of the parameter value sets that corresponds to the smallest function value, wherein the optimum power split ratio is to be used for energy management of the vehicle; and
F) transmitting the optimum power split ratio to the vehicle for setting power distribution related to the powering unit to the optimum power split ratio,
wherein in step A), the system parameters include the demanded power $P_d$, engine speed $\omega_e$ of the ICE, motor speed $\omega_m$ of the electric motor, a state of charge (SOC) of the battery source, and a power split ratio $\alpha$ that relates to power distribution between the ICE and the electric motor,
wherein in step B), the object function J is $J(P_d, SOC, \omega_e, \omega_m, \alpha) = \dot{m}_e + f(SOC) \times \dot{m}_b + \gamma_p$, where $\dot{m}_e$ represents actual fuel consumption of the ICE, $\dot{m}_b$ represents equivalent fuel consumption of the battery source, f(SOC) represents a weight factor of the equivalent fuel consumption of the battery source and is a function of the SOC, and $\gamma_p$ represents a penalty value that is related to a threshold value for output torque of the ICE and a threshold value for output torque of the electric motor,
wherein step E) includes making the parameter value of the power split ratio $\alpha$ that is contained in said one of the parameter value sets that corresponds to the smallest function value serve as the optimum power split ratio for management of power distribution between the ICE and the electric motor, and
wherein in step B), the object function J is $$J(P_d, SOC, \omega_e, \omega_m, \alpha) = \frac{\alpha \times P_d}{\eta_e \times LHV} + f(SOC) \times \frac{\frac{(1-\alpha) \times P_d}{\eta_m} \times BSFC_{avg}}{3600 \times \eta_b} + \gamma_p,$$

where $\eta_e$ represents engine efficiency of the ICE, LHV represents a lower heating value (LHV) of a fuel used by the ICE, $\eta_b$ represents discharge efficiency of the battery source, $\eta_m$ represents motor efficiency of the electric motor, $BSFC_{avg}$ represents an average of values of brake specific fuel consumption (BSFC) of the ICE over a predefined operation period, where the BSFC is defined as an amount of fuel consumed for producing 1 kWh of energy, and $\gamma_p$ is equal to zero when a value of the output torque of the ICE is not greater than the threshold value therefor and a value of the output torque of the electric motor is not greater than the threshold value therefor, and is equal to a predetermined value greater than zero when the value of any of the output torque of the ICE and the output torque of the electric motor is greater than the threshold value therefor.

2. The method as claimed in claim 1, wherein in step C), the characteristics information contains the LHV of the fuel used by the ICE, data of the BSFC of the ICE that is related to the output torque of the ICE and the engine speed $\omega_e$ of the ICE, data of the engine efficiency $\eta_e$ that is related to the output torque of the ICE and the engine speed $\omega_e$ of the ICE, data of the motor efficiency $\eta_m$ that is related to the output torque of the electric motor and the motor speed $\omega_m$ of the electric motor, the threshold value for the output torque of the ICE, the threshold value for the output torque of the electric motor, a function that maps the SOC of the battery source to the weight factor f(SOC), and data of the discharge efficiency $\eta_b$ of the battery source that is related to the SOC.

3. The method as claimed in claim 2, wherein in step E):
the current conditions of the powering unit and the energy unit include a current value of the engine speed $\omega_e$ of the ICE, a current value of the motor speed $\omega_m$ of the electric motor and a current value of the SOC of the battery source; and
in said one of the parameter value sets that corresponds to the smallest function value, the parameter value of the engine speed $\omega_e$ of the ICE, the parameter value of the motor speed $\omega_m$ of the electric motor, the parameter value of the SOC of the battery source and the parameter value of the demanded power $P_d$ respectively match the current value of the engine speed co, of the ICE, the current value of the motor speed $\omega_m$ of the electric motor, the current value of the SOC of the battery source and the value of the demanded power $P_d$ of the vehicle.

4. The method as claimed in claim 1, wherein in step E), the smallest function value and said one of the parameter value sets that corresponds thereto in the database are determined by one of a direct search algorithm and an interpolation search algorithm.

5. A method of energy management to be utilized on a vehicle with multiple energy sources, the vehicle including a powering unit for driving a transmission mechanism of the vehicle, and an energy unit which supplies energy to the powering unit, the powering unit including an electric motor, the energy unit including a first battery source and a second battery source that are different ones selected from a group consisting of a lithium battery, a fuel cell and a supercapacitor (SC), the method to be implemented by a computer system and comprising:
A) based on a configuration of the powering unit and the energy unit, deciding a plurality of system parameters that are related to the powering unit and the energy unit;
B) based on the system parameters thus decided and the configuration of the powering unit and the energy unit, determining an object function J that represents a total equivalent energy consumption of the vehicle and that is associated with the system parameters;
C) based on the configuration of the powering unit and the energy unit, obtaining characteristics information that is related to the powering unit and the energy unit, and obtaining a plurality of predetermined ranges respectively of the system parameters;
D) calculating, based on the characteristics information and the predetermined ranges of the system parameters, a plurality of function values of the object function J each corresponding to a respective one of multiple parameter value sets each containing corresponding parameter values, where for each of the parameter value sets, each of the parameter values contained therein is a value of a respective one of the system parameters, so as to establish a database that records the function values thus calculated and the respective parameter value sets, the parameter values contained in the parameter value sets being obtained by performing discretization on the predetermined ranges of the system parameters;
E) determining a smallest function value among the function values in the database that correspond to those of the parameter value sets that contain the parameter values which meet current conditions of the powering unit and the energy unit and which correspond to a value of demanded power $P_d$ of the vehicle, and determining an optimum power split ratio based on one of the parameter value sets that corresponds to the smallest function value, wherein the optimum power split ratio is to be used for energy management of the vehicle; and
F) transmitting the optimum power split ratio to the vehicle for setting power distribution between the first battery source and the second battery source to the optimum power split ratio,
wherein in step A), the system parameters include the demanded power $P_d$, a state of charge (SOC) of the second battery source, and a power split ratio $\alpha$ that relates to power contribution between the first battery source and the second battery source,
wherein in step B), the object function J is $J(P_d,SOC,\alpha)=\dot{m}_{b1}\ f(SOC)\times\dot{m}_{b2}+\gamma_p$, where $\dot{m}_{b1}$ represents actual energy consumption of the first battery source, $\dot{m}_{b2}$ represents equivalent energy consumption of the second battery source, f(SOC) represents a weight factor of the equivalent energy consumption of the second battery source and is a function of the SOC, and $\gamma_p$ represents a penalty value that is related to a threshold value for output power of the first battery source and a threshold value for output power of the second battery source, and
wherein step E) includes making the parameter value of the power split ratio $\alpha$ that is contained in said one of the parameter value sets that corresponds to the smallest function value serve as the optimum power split ratio for management of power distribution between the first battery source and the second battery source.

6. The method as claimed in claim 5, wherein in step B), the object function J is $$J(P_d, SOC, \alpha) = \frac{\alpha \times P_d}{\eta_{DC,b1}} + f(SOC) \times \frac{(1-\alpha) \times P_d}{\eta_{b2} \times \eta_{DC,b2}} + \gamma_p,$$

where $\eta_{DC,b1}$ represents DC/DC conversion efficiency of the first battery source, $\eta_{DC,b2}$ represents DC/DC conversion efficiency of the second battery source, $\eta_{b2}$ represents discharge efficiency of the second battery source, and $\gamma_p$ is equal to zero when a value of the output power of the first battery source is not greater than the threshold value therefor and a value of the output power of the second battery source is not greater than the threshold value therefor, and is equal to a predetermined value greater than zero when the value of any of the output power of the first battery source and the output power of the second battery source is greater than the threshold value therefor.

7. The method as claimed in claim 6, wherein in step C), the characteristics information contains the threshold value for the output power of the first battery source, the threshold value for the output power of the second battery source, data of the DC/DC conversion efficiency $\eta_{DC,b1}$ of the first battery source that is related to the output power of the first battery source, data of the DC/DC conversion efficiency $\eta_{DC,b2}$ of the second battery source that is related to the output power of the second battery source, data of the discharge efficiency $\eta_{b2}$ of the second battery source that is related to the SOC of the second battery source, and a function that maps the SOC of the second battery source to the weight factor f(SOC).

8. The method as claimed in claim 7, wherein in step E):
the current conditions of the powering unit and the energy unit include a current value of the SOC of the second battery source; and
in said one of the parameter value sets that corresponds to the smallest function value, the parameter value of the SOC of the second battery source and the parameter value of the demanded power $P_d$ respectively match the current value of the SOC of the second battery source and the value of the demanded power $P_d$ of the vehicle.

9. A computer system for energy management to be utilized on a vehicle with multiple energy sources, the vehicle including a powering unit, and an energy unit which supplies energy to the powering unit, the powering unit including an internal combustion engine (ICE) and an electric motor, the energy unit including a fuel source and a battery source that is one of a lithium battery, a fuel cell and a supercapacitor (SC), said computer system comprising:
a parameter determination module configured to decide, based on a configuration of the powering unit and the energy unit, a plurality of system parameters that are related to the powering unit and the energy unit;
an object function determination module communicable with said parameter determination module, and configured to determine, based on the system parameters and the configuration of the powering unit and the energy unit, an object function J that represents a total equivalent energy consumption of the vehicle and that is associated with the system parameters;
a storage configured to store characteristics information that is related to the powering unit and the energy unit, and a plurality of predetermined ranges respectively of the system parameters;
a processing module communicable with said object function determination module and said storage, and configured to calculate, based on the characteristics information and the predetermined ranges of the system parameters, a plurality of function values of the object function J each corresponding to a respective one of multiple parameter value sets each containing corresponding parameter values, where for each of the parameter value sets, each of the parameter values contained therein is a value of a respective one of the system parameters, so as to establish a database that records the function values thus calculated and the respective parameter value sets, the parameter values contained in the parameter value sets being obtained by performing discretization on the predetermined ranges of the system parameters; and
a search module communicable with said database, and configured to receive a condition signal which is transmitted by the vehicle and which specifies current conditions of the powering unit and the energy unit, to receive a value of demanded power $P_d$ of the vehicle, to determine a smallest function value among the function values in said database that correspond to those of the parameter value sets that contain the parameter values which meet the current conditions of the powering unit and the energy unit and which correspond to the value of demanded power $P_d$ of the vehicle, to determine an optimum power split ratio based on one of the parameter value sets that corresponds to the smallest function value, wherein the optimum power split ratio is to be used for energy management of the vehicle, and to transmit the optimum power split ratio to the vehicle for setting power distribution related to the powering unit to the optimum power split ratio, wherein the system parameters include the demanded power $P_d$, engine speed co, of the ICE, motor speed $\omega_m$ of the electric motor, a state of charge (SOC) of the battery source, and a power split ratio α that relates to power distribution between the ICE and the electric motor, wherein the object function J is $J(P_d,SOC,\omega_e,\omega_m,\alpha)=\dot{m}_e + f(SOC)\times\dot{m}_b+\gamma_p$, where $\dot{m}_e$ represents actual fuel consumption of the ICE, $\dot{m}_b$ represents equivalent fuel consumption of the battery source, f(SOC) represents a weight factor of the equivalent fuel consumption of the battery source and is a function of the SOC, and $\gamma_p$ represents a penalty value that is related to a threshold value for output torque of the ICE and a threshold value for output torque of said electric motor, wherein said search module is further configured to make the parameter value of the power split ratio α that is contained in said one of the parameter value sets that corresponds to the smallest function value serve as the optimum power split ratio for management of power distribution between the ICE and the electric motor, and wherein the object function J is $$J(P_d, SOC, \omega_e, \omega_m, \alpha) = \frac{\alpha \times P_d}{\eta_e \times LHV} + f(SOC) \times \frac{\frac{(1-\alpha)\times p_d}{\eta_m} \times BSFC_{avg}}{3600 \times \eta_b} + \gamma_p,$$

where $\eta_e$ represents engine efficiency of the ICE, LHV represents a lower heating value (LHV) of a fuel used by the ICE, $\eta_b$ represents discharge efficiency of the battery source, $\eta_m$ represents motor efficiency of the electric motor, $BSFC_{avg}$ represents an average of values of brake specific fuel consumption (BSFC) of the ICE over a predefined operation period, where the BSFC is defined as an amount of fuel consumed for producing 1 kWh of energy, and $\gamma_p$ is equal to zero when a value of the output torque of the ICE is not greater than the threshold value therefor and a value of the output torque of the electric motor is not greater than the threshold value therefor, and is equal to a predetermined value greater than zero when the value of any of the output torque of the ICE and the output torque of the electric motor is greater than the threshold value therefor.

10. The computer system as claimed in claim 9, wherein the characteristics information contains the LHV of the fuel used by the ICE, data of the BSFC of the ICE that is related to the output torque of the ICE and the engine speed $\omega_e$ of the ICE, data of the engine efficiency $\eta_e$ that is related to the output torque of the ICE and the engine speed $\omega_e$ of the ICE, data of the motor efficiency $\eta_m$ that is related to the output torque of the electric motor and the motor speed $\omega_m$ of the electric motor, the threshold value for the output torque of the ICE, the threshold value for the output torque of the electric motor, a function that maps the SOC of the battery source to the weight factor f(SOC), and data of the discharge efficiency $\eta_b$ of the battery source that is related to the SOC.

11. The computer system as claimed in claim 10, wherein:

the current conditions of the powering unit and the energy unit include a current value of the engine speed $\omega_e$ of the ICE, a current value of the motor speed $\omega_m$ of the electric motor and a current value of the SOC of the battery source; and in said one of the parameter value sets that corresponds to the smallest function value, the parameter value of the engine speed $\omega_e$ of the ICE, the parameter value of the motor speed $\omega_m$ of the electric motor, the parameter value of the SOC of the battery source and the parameter value of the demanded power $P_d$ respectively match the current value of the engine speed $\omega_e$ of the ICE, the current value of the motor speed $\omega_m$ of the electric motor, the current value of the SOC of the battery source and the value of the demanded power $P_d$ of the vehicle.

12. The computer system as claimed in claim 9, wherein the smallest function value and said one of the parameter value sets that corresponds thereto in the database are determined by one of a direct search algorithm and an interpolation search algorithm.

13. A computer system for energy management to be utilized on a vehicle with multiple energy sources, the vehicle including a powering unit, and an energy unit which supplies energy to the powering unit, the powering unit including an electric motor, the energy unit including a first battery source and a second battery source that are different ones selected from a group consisting of a lithium battery, a fuel cell and a supercapacitor (SC), said computer system comprising:

a parameter determination module configured to decide, based on a configuration of the powering unit and the energy unit, a plurality of system parameters that are related to the powering unit and the energy unit;

an object function determination module communicable with said parameter determination module, and configured to determine, based on the system parameters and the configuration of the powering unit and the energy unit, an object function J that represents a total equivalent energy consumption of the vehicle and that is associated with the system parameters;

a storage configured to store characteristics information that is related to the powering unit and the energy unit, and a plurality of predetermined ranges respectively of the system parameters;

a processing module communicable with said object function determination module and said storage, and configured to calculate, based on the characteristics information and the predetermined ranges of the system parameters, a plurality of function values of the object function J each corresponding to a respective one of multiple parameter value sets each containing corresponding parameter values, where for each of the parameter value sets, each of the parameter values contained therein is a value of a respective one of the system parameters, so as to establish a database that records the function values thus calculated and the respective parameter value sets, the parameter values contained in the parameter value sets being obtained by performing discretization on the predetermined ranges of the system parameters; and a search module communicable with said database, and configured to receive a condition signal which is transmitted by the vehicle and which specifies current conditions of the powering unit and the energy unit, to receive a value of demanded power $P_d$ of the vehicle, to determine a smallest function value among the function values in said database that correspond to those of the parameter value sets that contain the parameter values which meet the current conditions of the powering unit and the energy unit and which correspond to the value of demanded power $P_d$ of the vehicle, to determine an optimum power split ratio based on one of the parameter value sets that corresponds to the smallest function value, wherein the optimum power split ratio is to be used for energy management of the vehicle, and to transmit the optimum power split ratio to the vehicle for setting power distribution between the first battery source and the second battery source to the optimum power split ratio, wherein the system parameters include the demanded power $P_d$, a state of charge (SOC) of the second battery source, and a power split ratio $\alpha$ that relates to power contribution between the first battery source and the second battery source, wherein the object function J is $J(P_d,SOC,\alpha)=\dot{m}_{b1}+f(SOC)\times\dot{m}_{b2}+\gamma_p$, where $\dot{m}_{b1}$ represents actual energy consumption of the first battery source, $\dot{m}_{b2}$ represents equivalent energy consumption of the second battery source, f(SOC) represents a weight factor of the equivalent energy consumption of the second battery source and is a function of the SOC, and $\gamma_p$ represents a penalty value that is related to a threshold value for output power of the first battery source and a threshold value for output power of the second battery source, and wherein said search module is further configured to make the parameter value of the power split ratio $\alpha$ that is contained in said one of the parameter value sets that corresponds to the smallest function value serve as the optimum power split ratio for management of power distribution between the first battery source and the second battery source.

14. The computer system as claimed in claim 13, wherein the object function J is $$J(P_d, SOC, \alpha) = \frac{\alpha \times P_d}{\eta_{DC,b1}} + f(SOC) \times \frac{(1-\alpha) \times P_d}{\eta_{b2} \times \eta_{DC,b2}} + \gamma_p,$$

where $\eta_{DC,b1}$ represents DC/DC conversion efficiency of the first battery source, $\eta_{DC,b2}$ represents DC/DC conversion efficiency of the second battery source, $\eta_{b2}$ represents discharge efficiency of the second battery source, and $\gamma_p$ is equal to zero when a value of the output power of the first battery source is not greater than the threshold value therefor and a value of the output power of the second battery source is not greater than the threshold value therefor, and is equal to a predetermined value greater than zero when the value of any of the output power of the first battery source and the output power of the second battery source is greater than the threshold value therefor.

15. The computer system as claimed in claim 14, wherein the characteristics information contains the threshold value for the output power of the first battery source, the threshold value for the output power of the second battery source, data of the DC/DC conversion efficiency $\eta_{DC,b1}$ of the first battery source that is related to the output power of the first battery source, data of the DC/DC conversion efficiency $\eta_{DC,b2}$ of the second battery source that is related to the output power of the second battery source, data of the discharge efficiency $\eta_{b2}$ of the second battery source that is related to the SOC of the second battery source, and a function that maps the SOC of the second battery source to the weight factor f(SOC).

16. The computer system as claimed in claim 15, wherein:
the current conditions of said powering unit and said energy unit include a current value of the SOC of the second battery source; and
in said one of the parameter value sets that corresponds to the smallest function value, the parameter value of the SOC of the second battery source and the parameter value of the demanded power $P_d$ respectively match the current value of the SOC of the second battery source and the value of the demanded power $P_d$ of the vehicle.

* * * * *